United States Patent
Eli et al.

(10) Patent No.: US 8,381,523 B2
(45) Date of Patent: Feb. 26, 2013

(54) GEOTHERMAL ELECTRICITY PRODUCTION METHODS AND GEOTHERMAL ENERGY COLLECTION SYSTEMS

(75) Inventors: Zadok Eli, Scottsdale, AZ (US); Bruce J. Kolinski, Phoenix, AZ (US)

(73) Assignee: Zadok Eli, Phoenix, AZ (US)

( * ) Notice: Subject to any disclaimer, the term of this patent is extended or adjusted under 35 U.S.C. 154(b) by 846 days.

(21) Appl. No.: 12/473,237

(22) Filed: May 27, 2009

(65) Prior Publication Data
US 2010/0300092 A1   Dec. 2, 2010

(51) Int. Cl.
*F03G 7/00* (2006.01)
(52) U.S. Cl. ..................... 60/641.2; 60/641.3
(58) Field of Classification Search ....... 60/641.2–641.4
See application file for complete search history.

(56) References Cited

U.S. PATENT DOCUMENTS

| | | | |
|---|---|---|---|
| 3,911,683 A * | 10/1975 | Wolf | 60/641.2 |
| 4,054,176 A * | 10/1977 | Van Huisen | 165/45 |
| 4,255,933 A | 3/1981 | Bailey et al. | |
| 4,392,531 A * | 7/1983 | Ippolito | 166/278 |
| 4,512,156 A | 4/1985 | Nagase | |
| 4,644,750 A | 2/1987 | Lockett et al. | |
| 5,072,783 A | 12/1991 | Ayala Martinez et al. | |
| 5,143,150 A | 9/1992 | Johnston | |
| 5,515,679 A | 5/1996 | Shulman | |
| 5,651,251 A | 7/1997 | Hardin | |
| 6,073,448 A | 6/2000 | Lozada | |
| 6,301,894 B1 | 10/2001 | Halff | |
| 6,708,494 B1 | 3/2004 | Hamann | |
| 7,251,938 B1 | 8/2007 | Bond | |
| 7,647,773 B1 * | 1/2010 | Koenig | 60/641.2 |
| 2007/0245729 A1 | 10/2007 | Mickleson | |

* cited by examiner

*Primary Examiner* — Hoang Nguyen

(57) ABSTRACT

Two Geothermal energy harnessing devices, steam producing System, electricity production Method and heat energy Method are invented for mining renewable geothermal heat energy within a non-polluting, re-circulating, closed cycle intended for electricity generating applications or for other direct or indirect heat uses. The devices, the "Geothermal Energy Collector" and the "Geothermal Energy Exchanger" can work with a Depressurized Mixing Container and a Pressurized Storage Container the entirety of which comprises "THE GEOTHERMAL FLUID HEATING OR STEAM PRODUCTION SYSTEM. The system serves other equipment, such as a phase separator, steam turbine, generator and condenser, which working together with the system comprises either "THE GEOTHERMAL ELECTRICITY PRODUCTION METHOD" or "THE GEOTHERMAL HEAT ENERGY METHOD". The GEC or GEE can work alone or within a system to add heat to any fluid and to use the heated fluid to supplement any appropriate technology, to produce electricity or for other direct or indirect uses.

4 Claims, 27 Drawing Sheets

Schematic Elevation Showing A Single GEC System With Seven Heat Exchange Cylinders

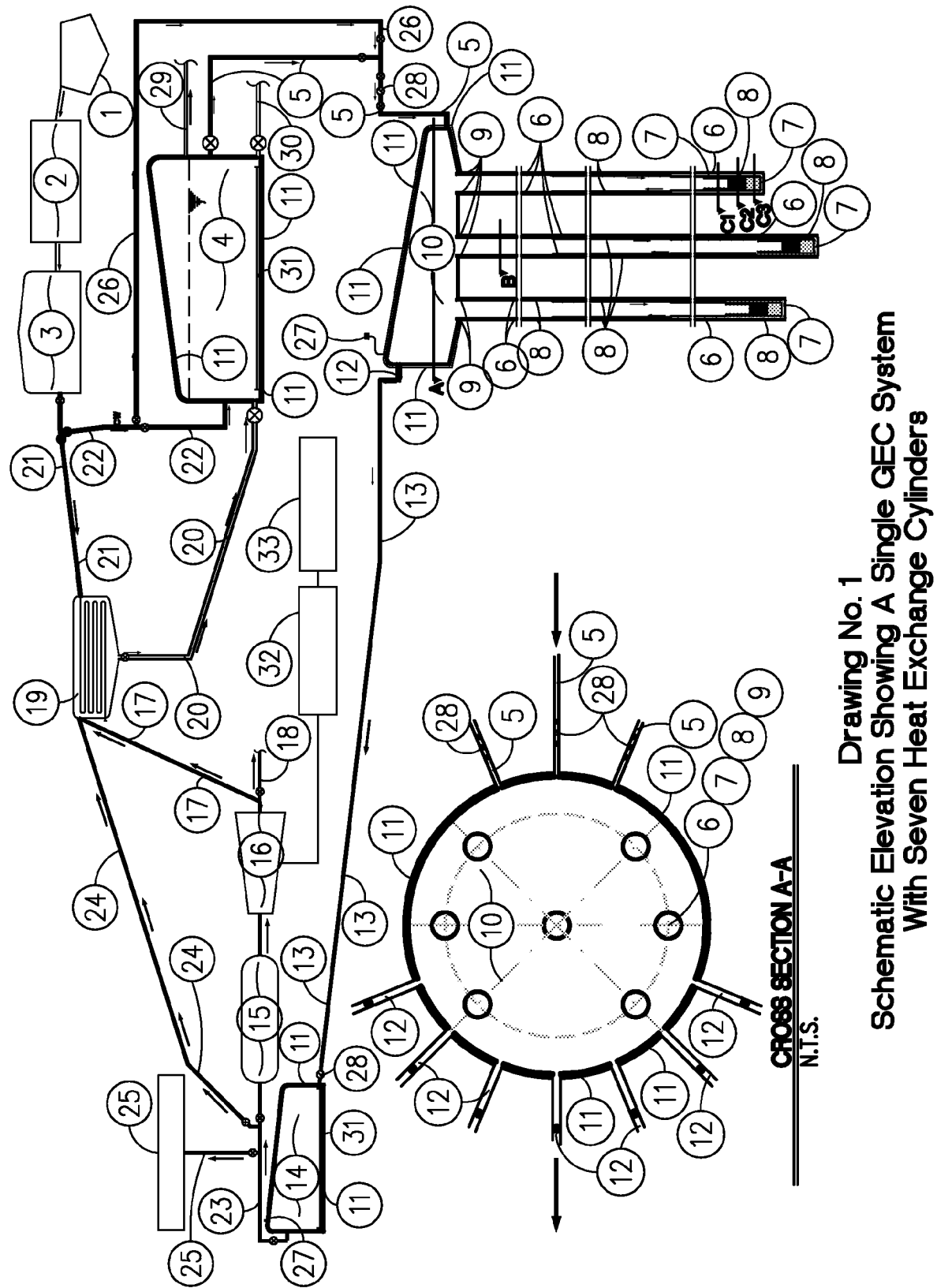
Drawing No. 1
Schematic Elevation Showing A Single GEC System
With Seven Heat Exchange Cylinders
CROSS SECTION A-A
N.T.S.

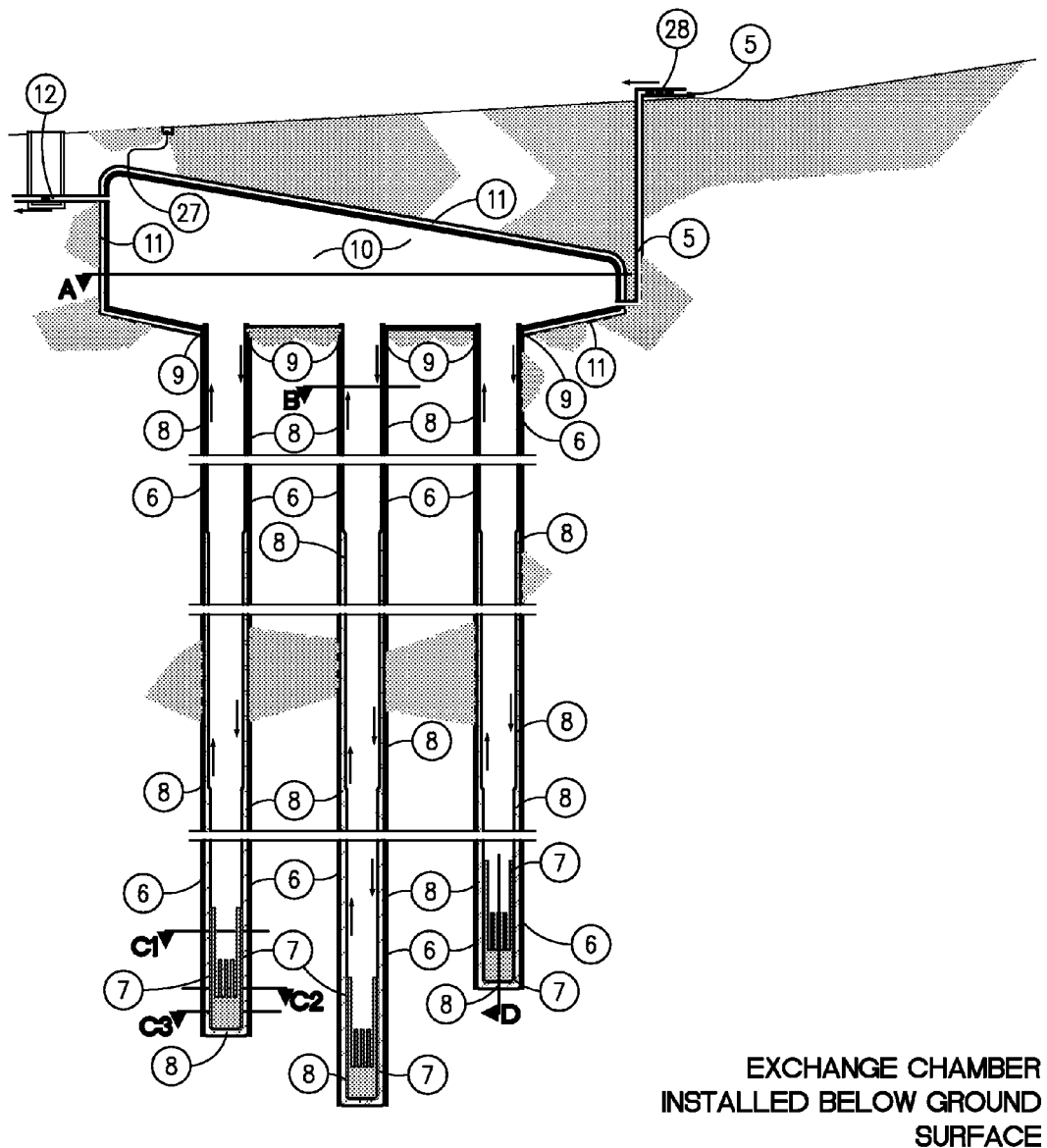
Drawing No. 2
Vertical Schematic Section Thru Below Ground Exchange Chamber
(Shows Thickened Wall With Variable Inside Diameter)

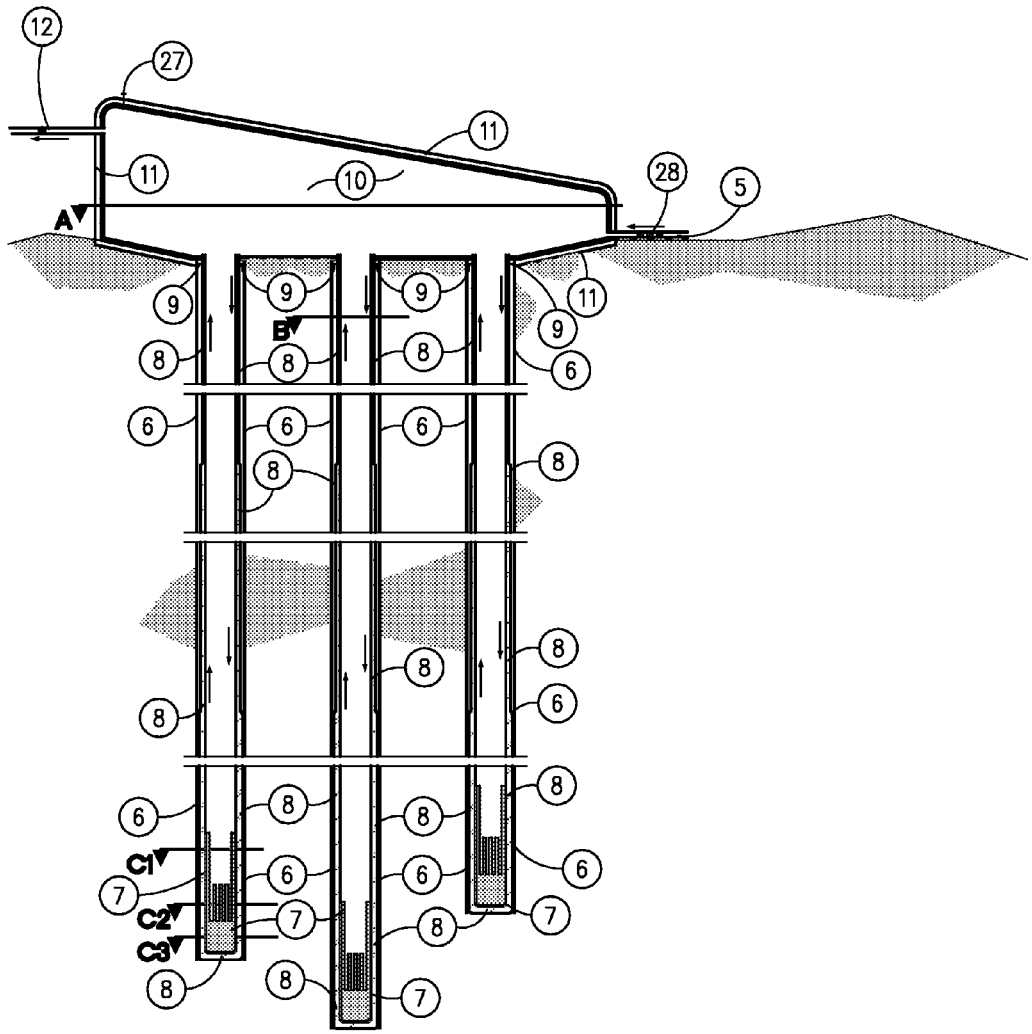
Drawing No. 3
Vertical Schematic Section Thru Above Ground Exchange Chamber
(Shows Thickened Wall With Variable Outside Diameter)
EXCHANGE CHAMBER
INSTALLED ABOVE GROUND
SURFACE

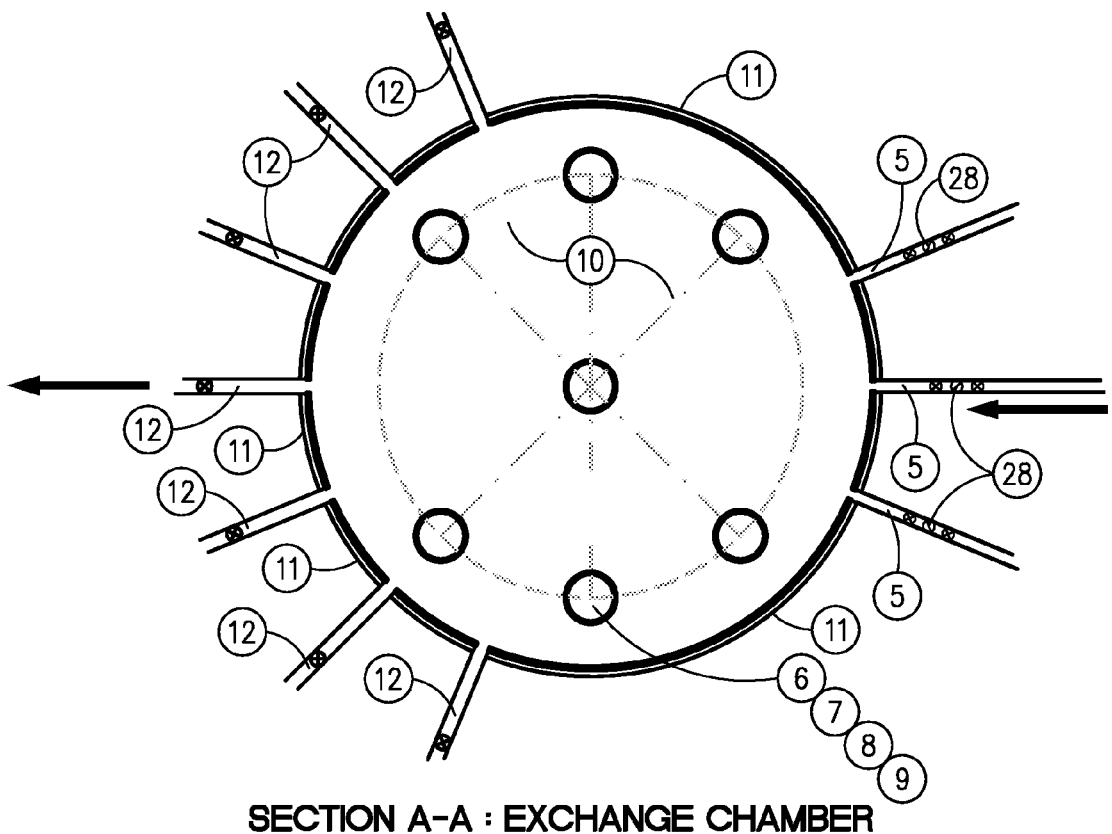
SECTION A-A : EXCHANGE CHAMBER
Drawing No. 4
Schematic Cross Section A-A
Showing Seven Heat Exchange Cylinders In One Chamber

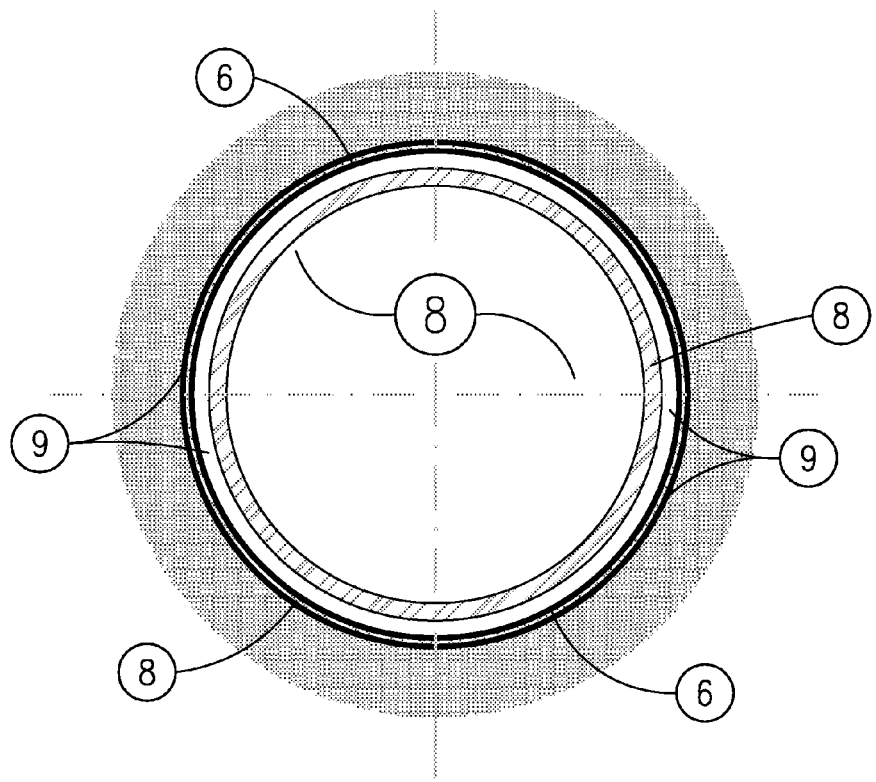
SECTION B-B
HEAT EXCHANGE CYLINDER
Drawing No. 5
Schematic Cross Section B-B : Heat Exchange Cylinder

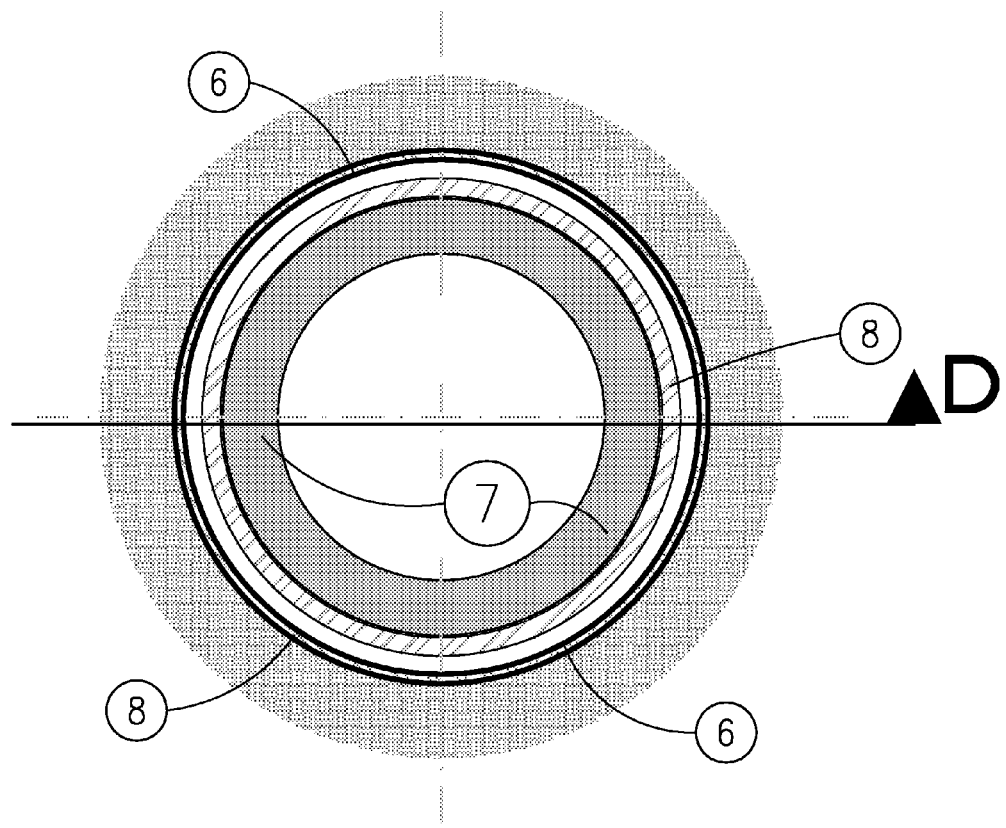
SECTION C-C 1
HEATING CORE - HOLLOW RING (TOP) SECTION
Drawing No. 6
Schematic Cross Section C-C 1: Top Ring Section of Heating Core

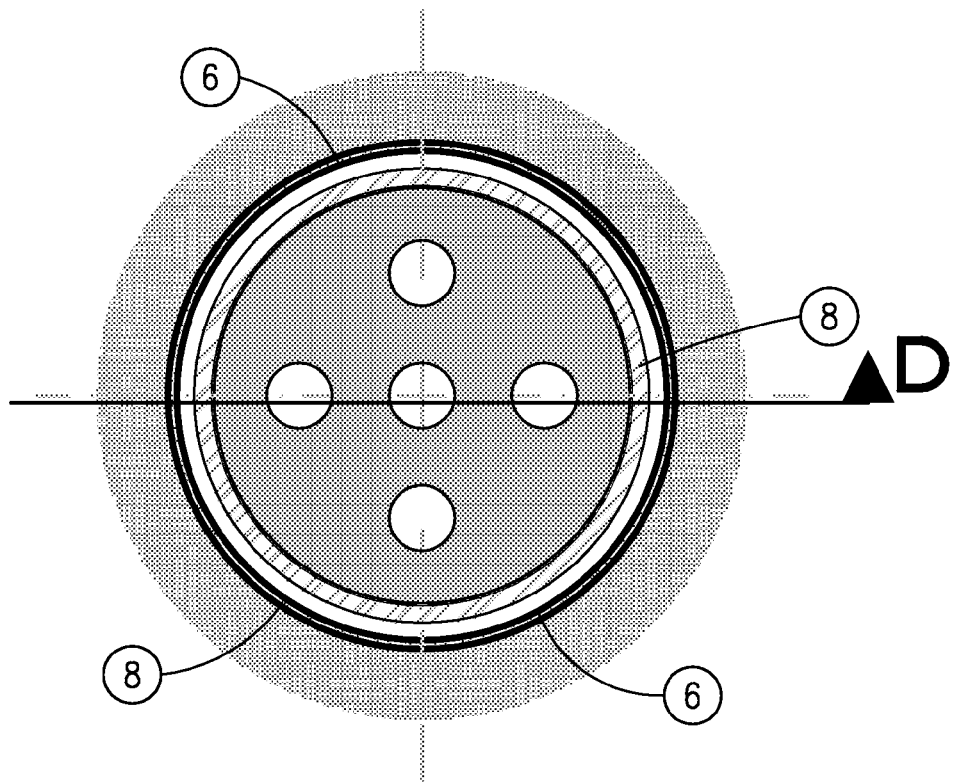
SECTION C-C 2
HEATING CORE - PERFORATED MIDDLE SECTION
Drawing No. 7
Schematic Cross Section C-C 2
Perforated Middle Section of Heating Core

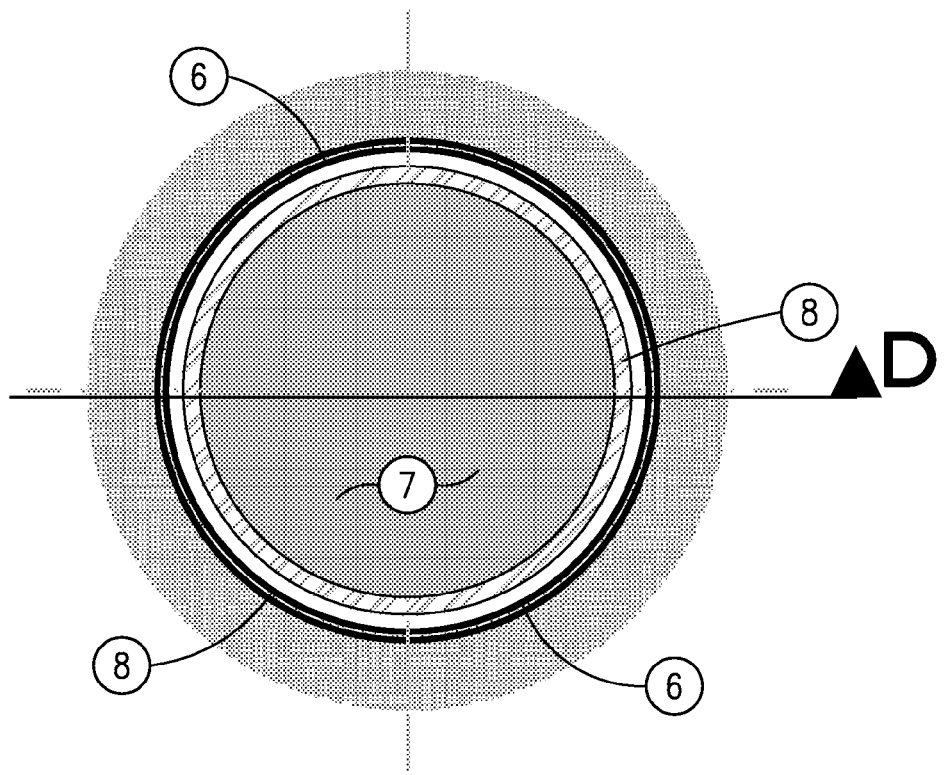
SECTION C-C 3
HEATING CORE – SOLID BOTTOM SECTION
Drawing No. 8
Schematic Cross Section C-C 3
Solid Bottom Section of Heating Core

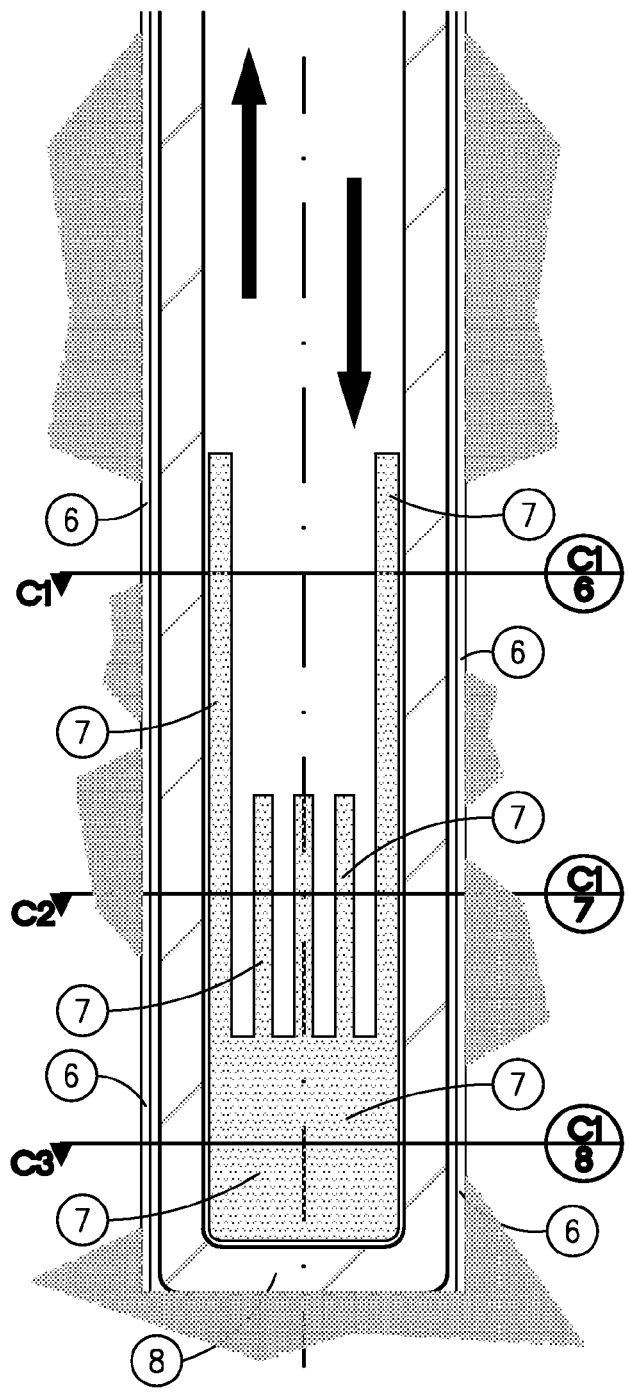
HEATING CORE – VERTICAL SECTION D-D
Drawing No. 9
Vertical Schematic Section D-D Through Heating Core
(Shows Enlarged View of Sealed Cylinder Bottom)

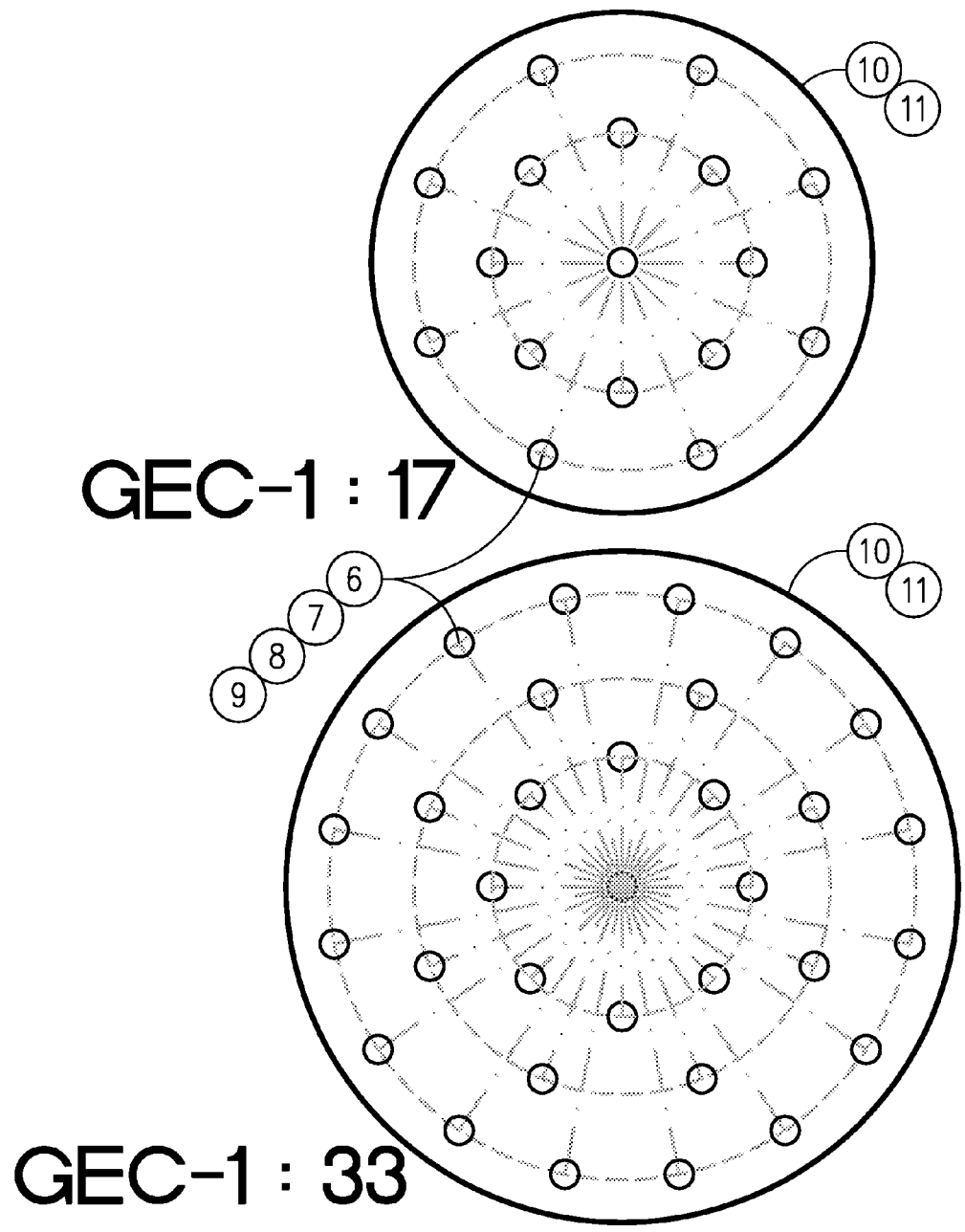
Drawing No. 10
Schematic Layouts For Exchange Chamber
With Multiple Heat Exchange Cylinders

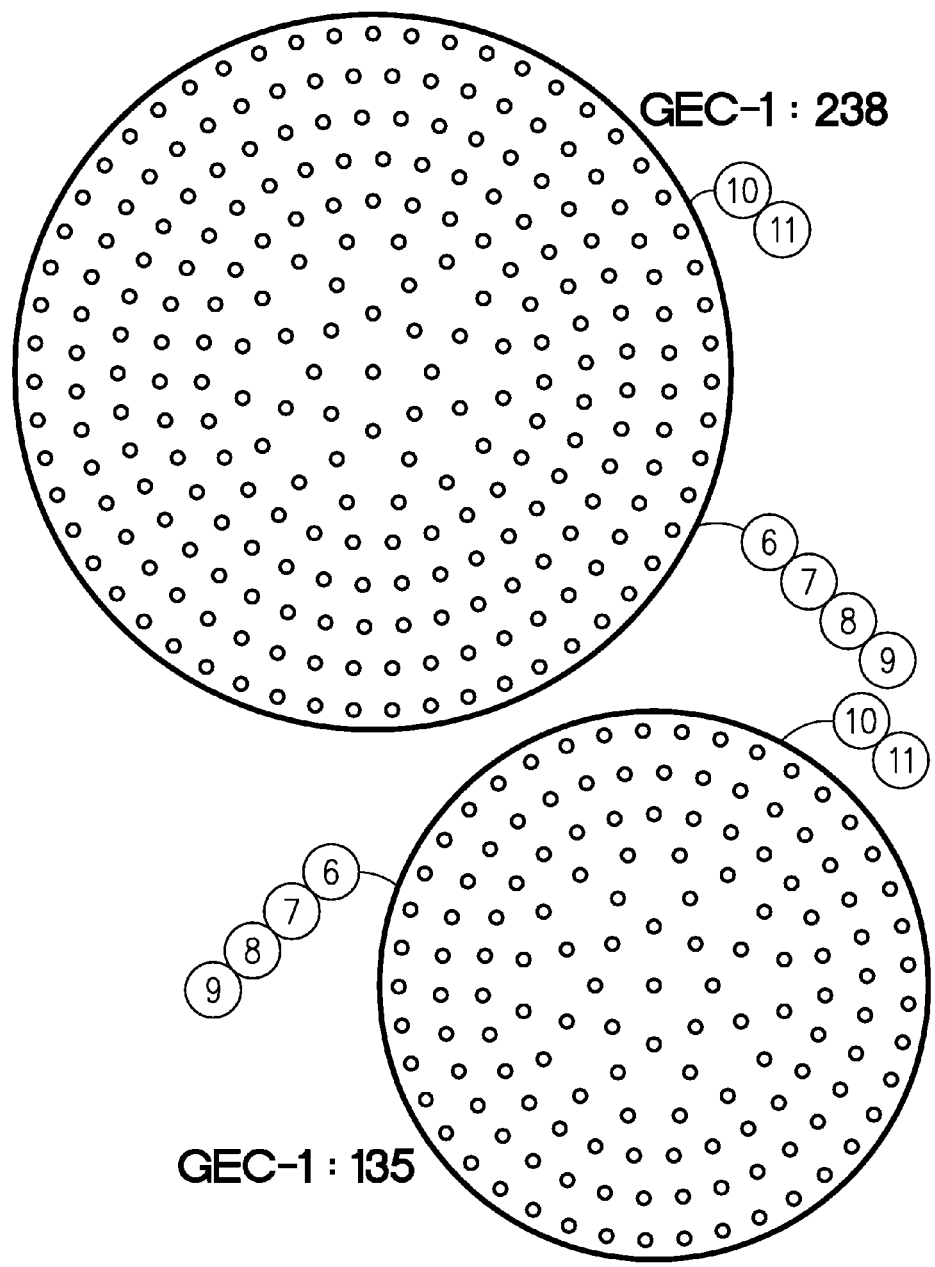
Drawing No. 11
Schematic Layouts For Higher Capacity Exchange Chambers

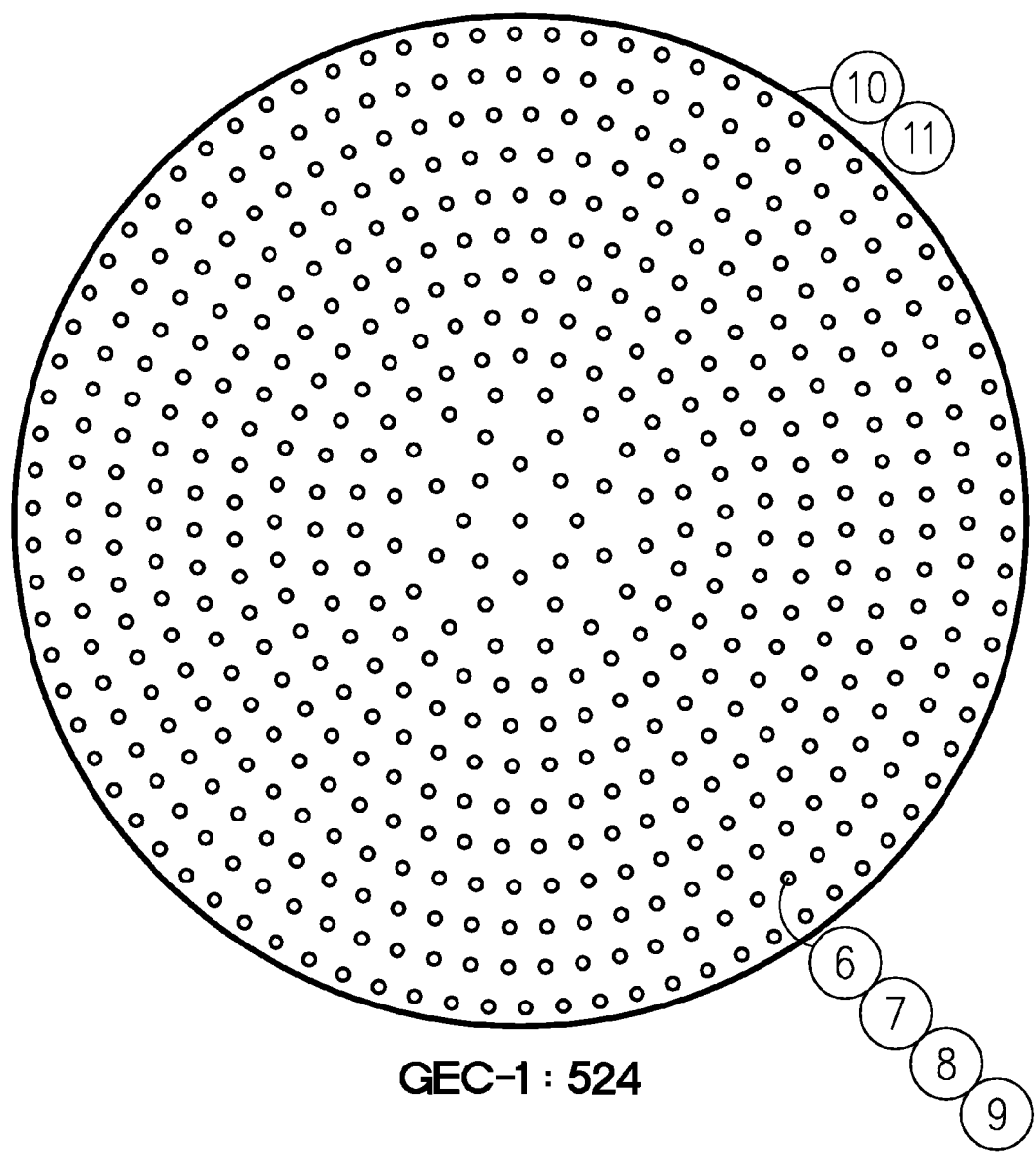
Drawing No. 12
Schematic Layout For High Capacity Exchange Chamber

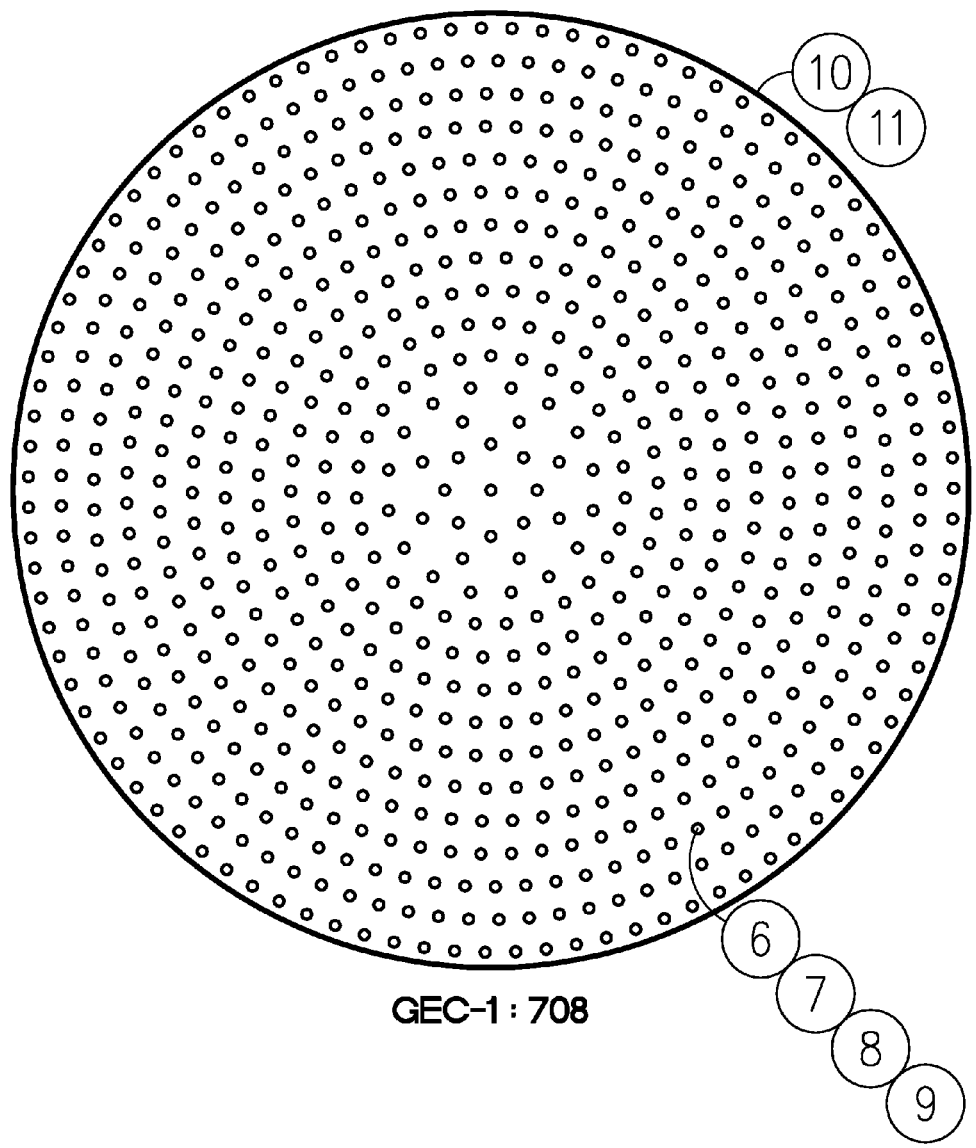
Drawing No. 13
Schematic Layout For Very High Capacity Exchange Chamber

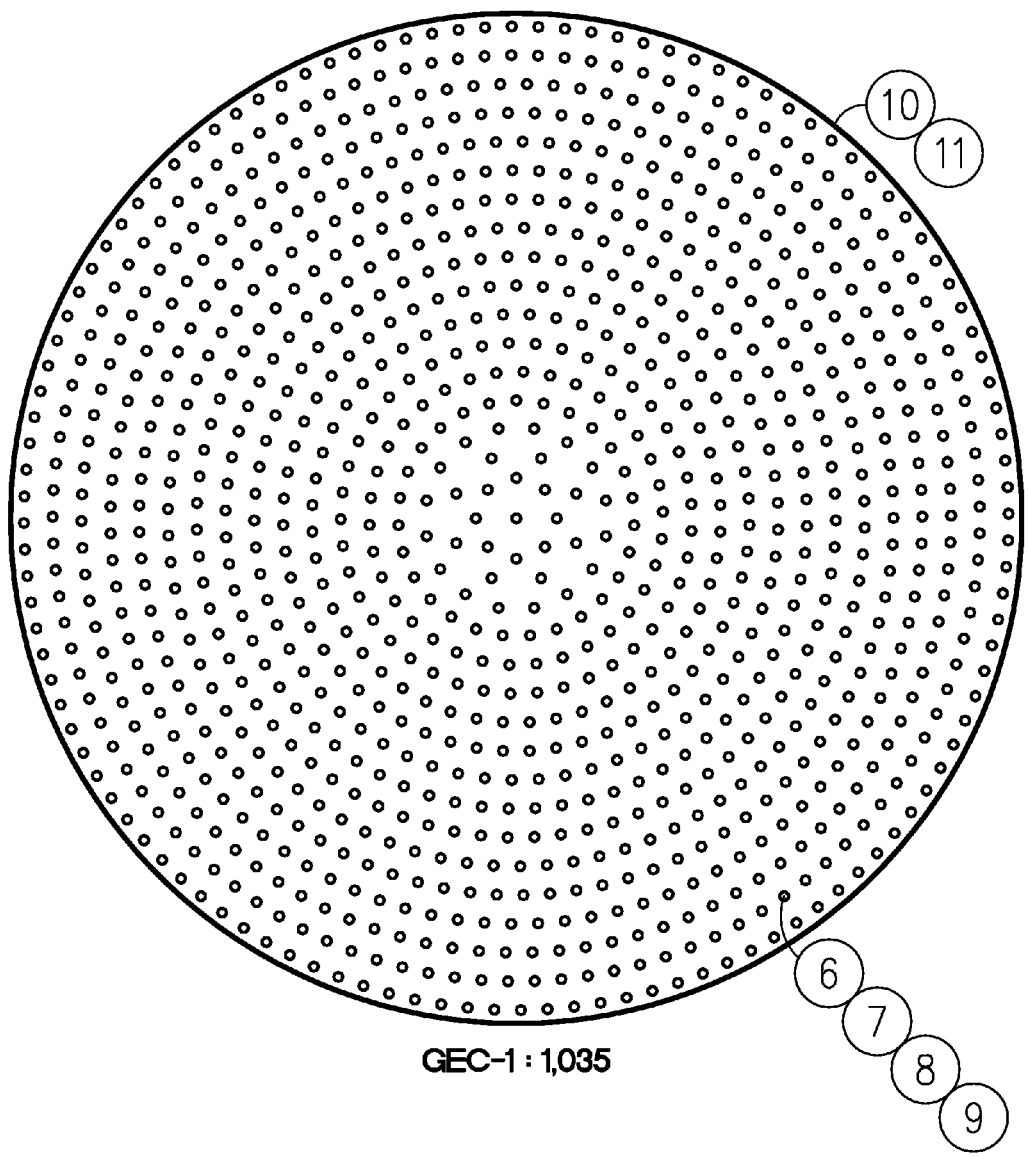
Drawing No. 14
Schematic Layout For Very High Capacity Exchange Chamber

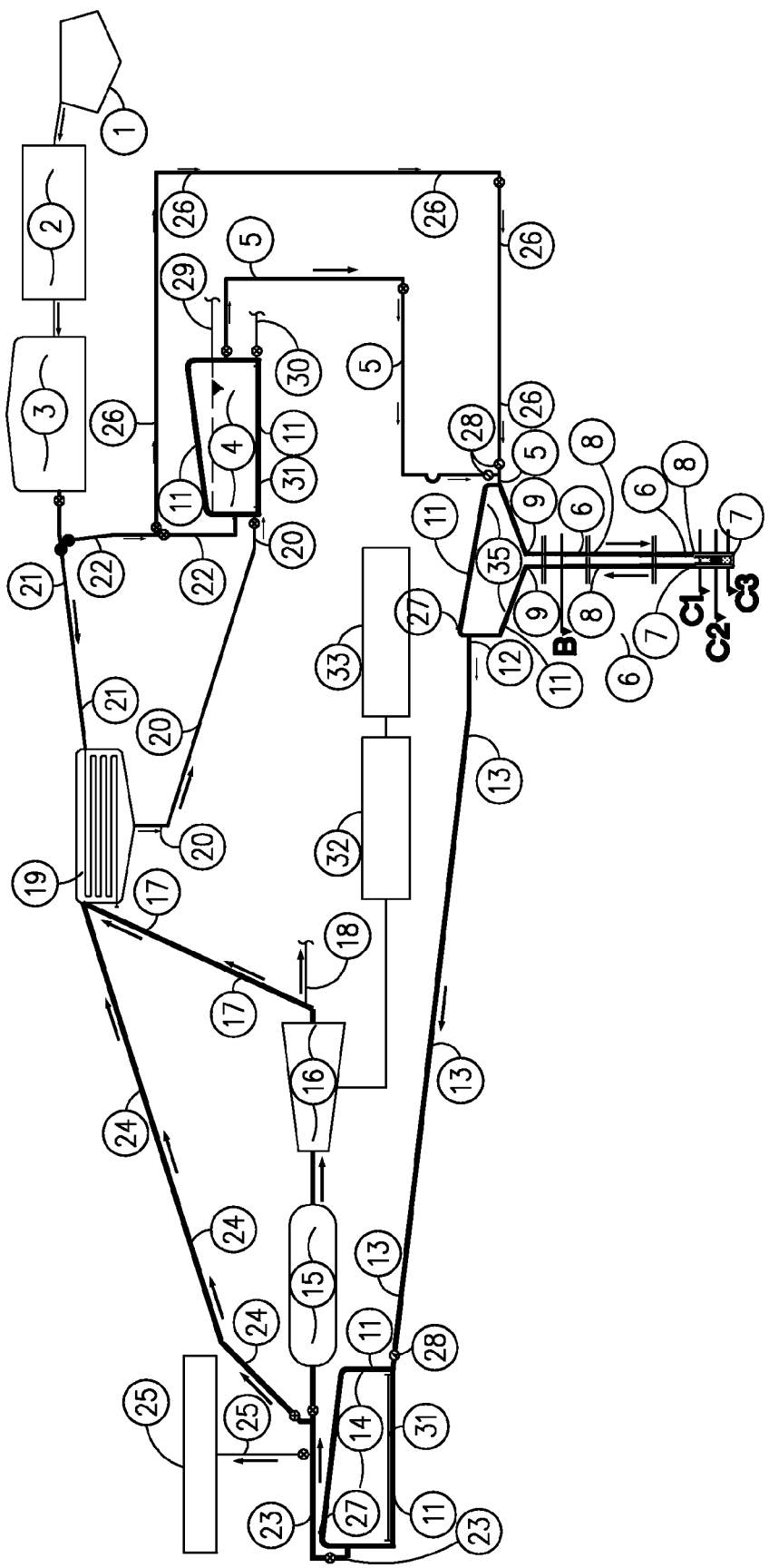
Drawing No. 15
Schematic Elevation Showing a GEE

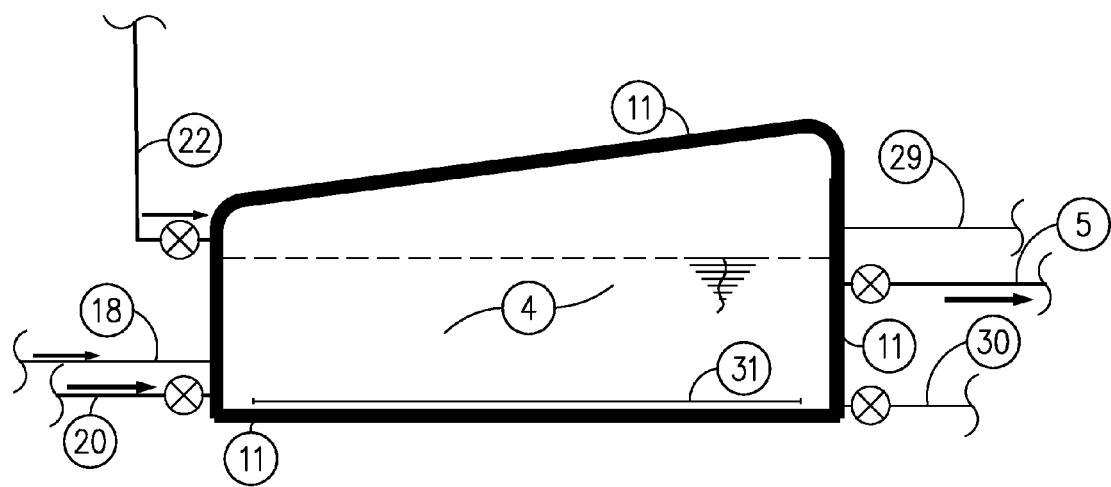
DEPRESSURIZED MIXING CONTAINER
Drawing No. 16
Schematic Example of Depressurized Mixing Container

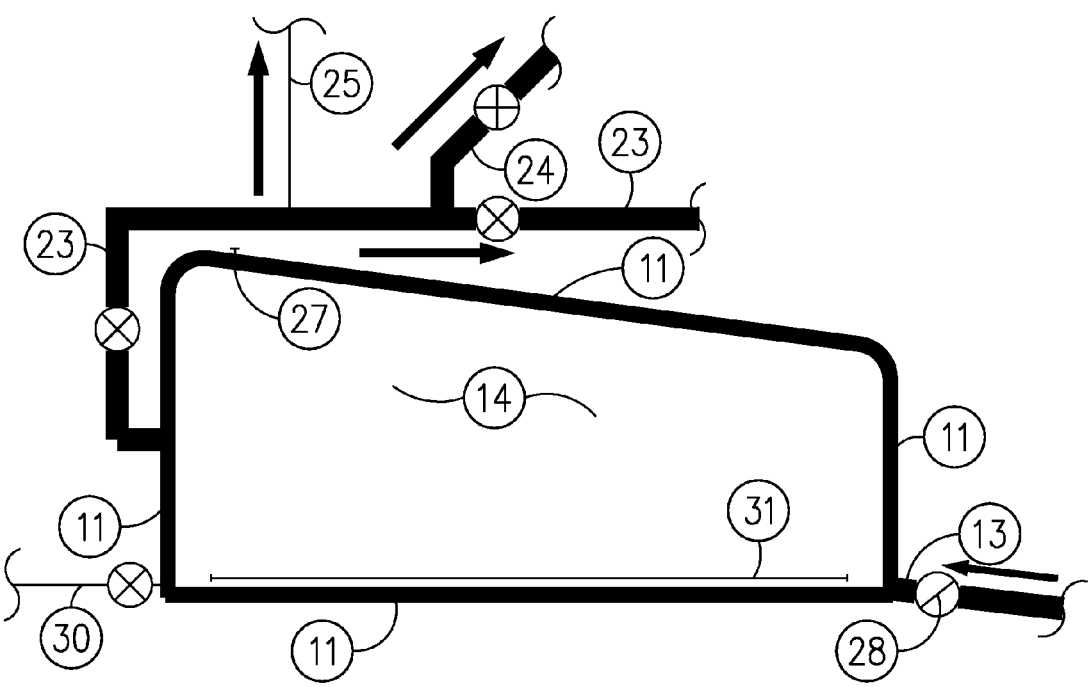
Drawing No. 17
Schematic Example of Pressurized Storage Container

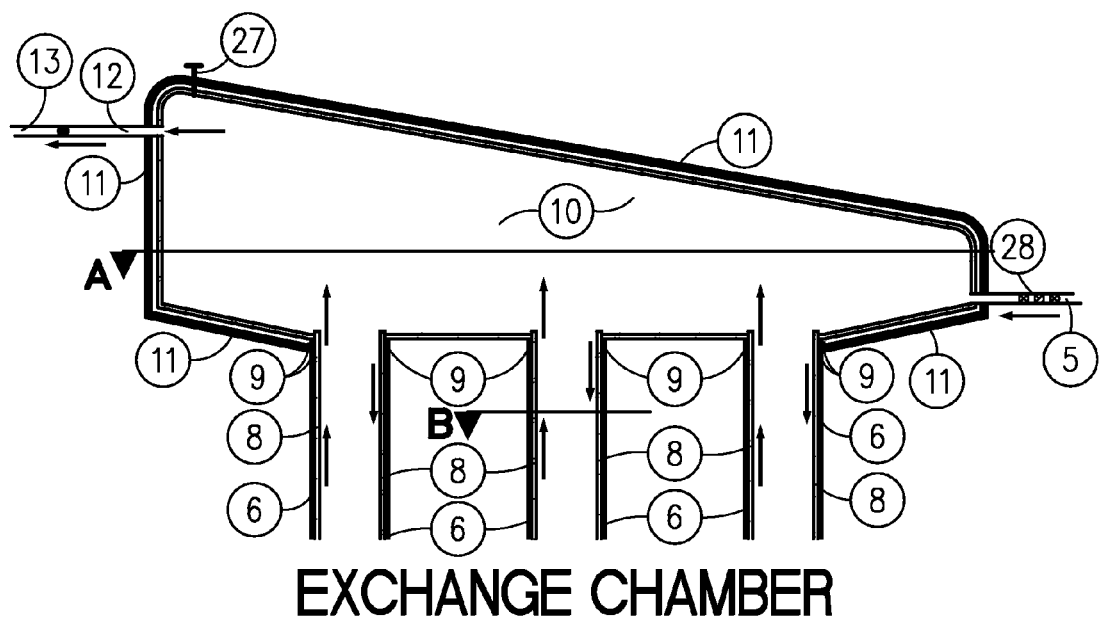
Drawing No. 18
Schematic Section of Exchange Chamber

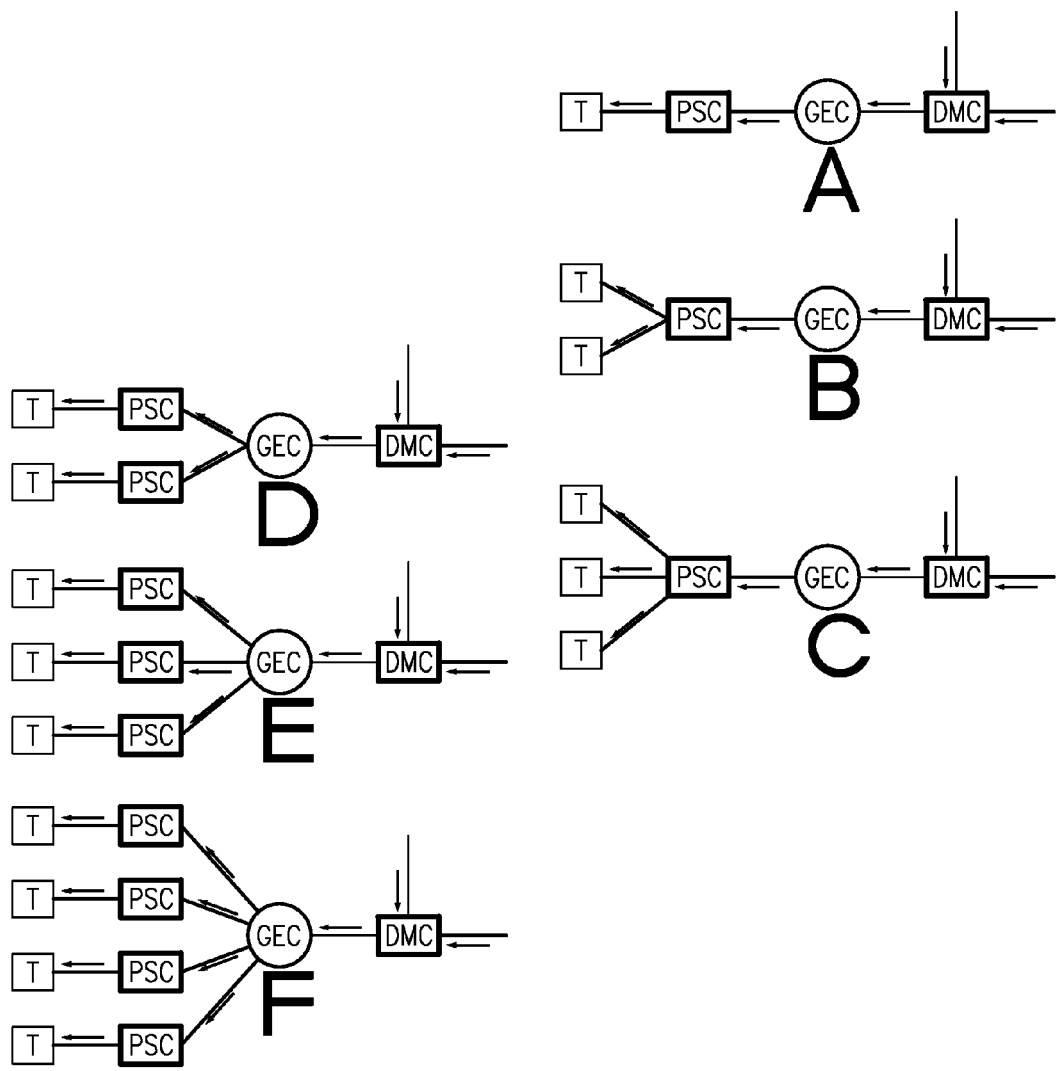
Drawing No. 19
Various Schematic Examples of System Layouts : A through F

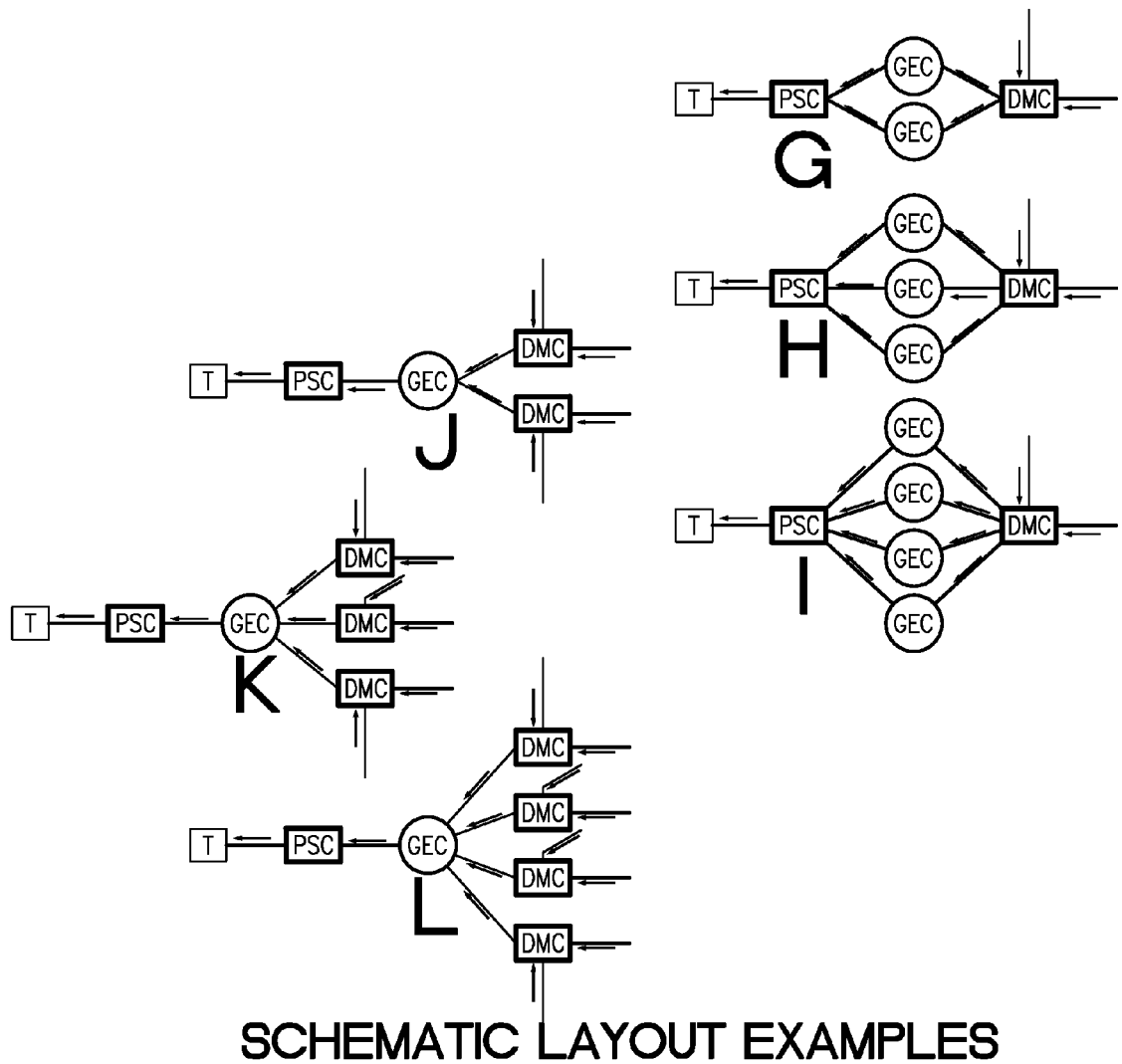
SCHEMATIC LAYOUT EXAMPLES
Drawing No. 20
Various Schematic Examples of System Layouts : G through L

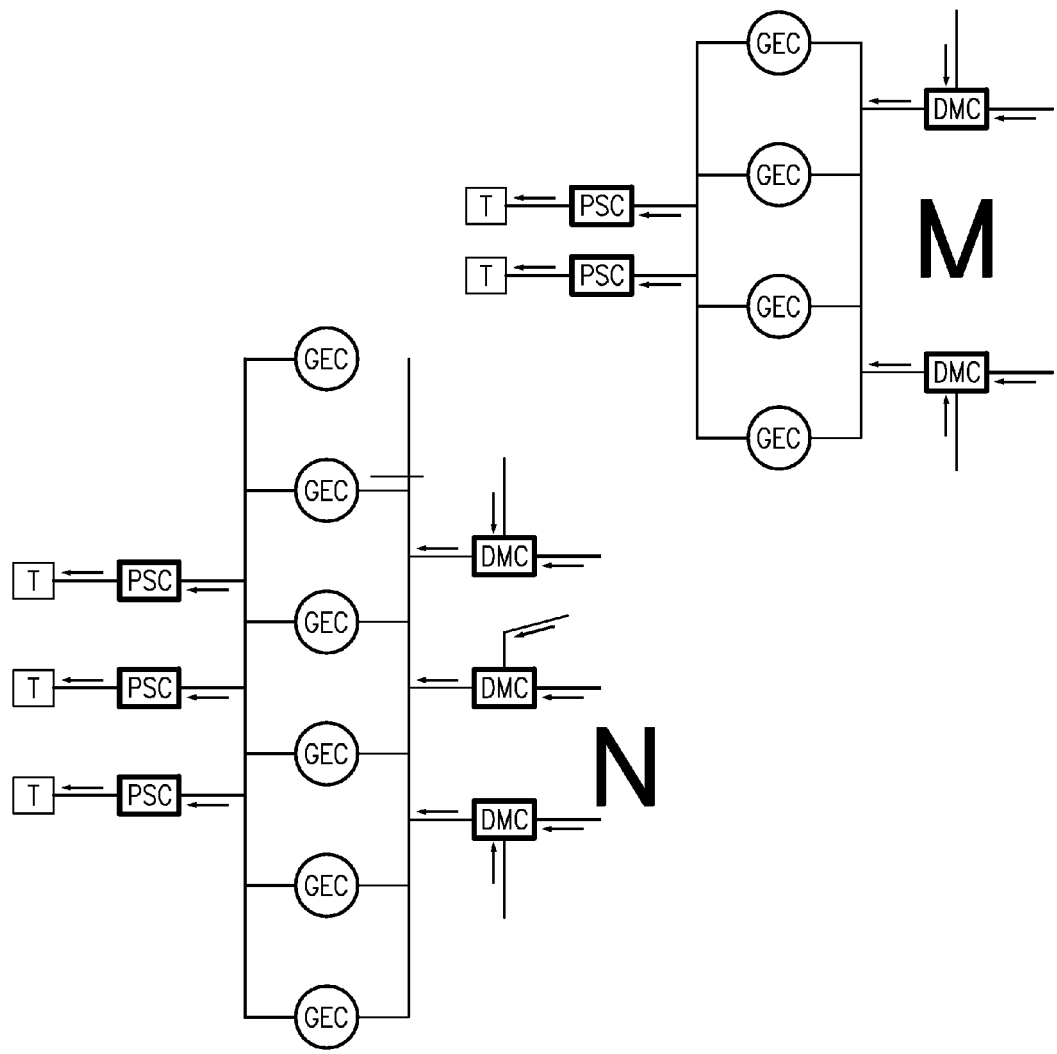
SCHEMATIC LAYOUT EXAMPLES
Drawing No. 21
Various Schematic Examples of System Layouts : M and N

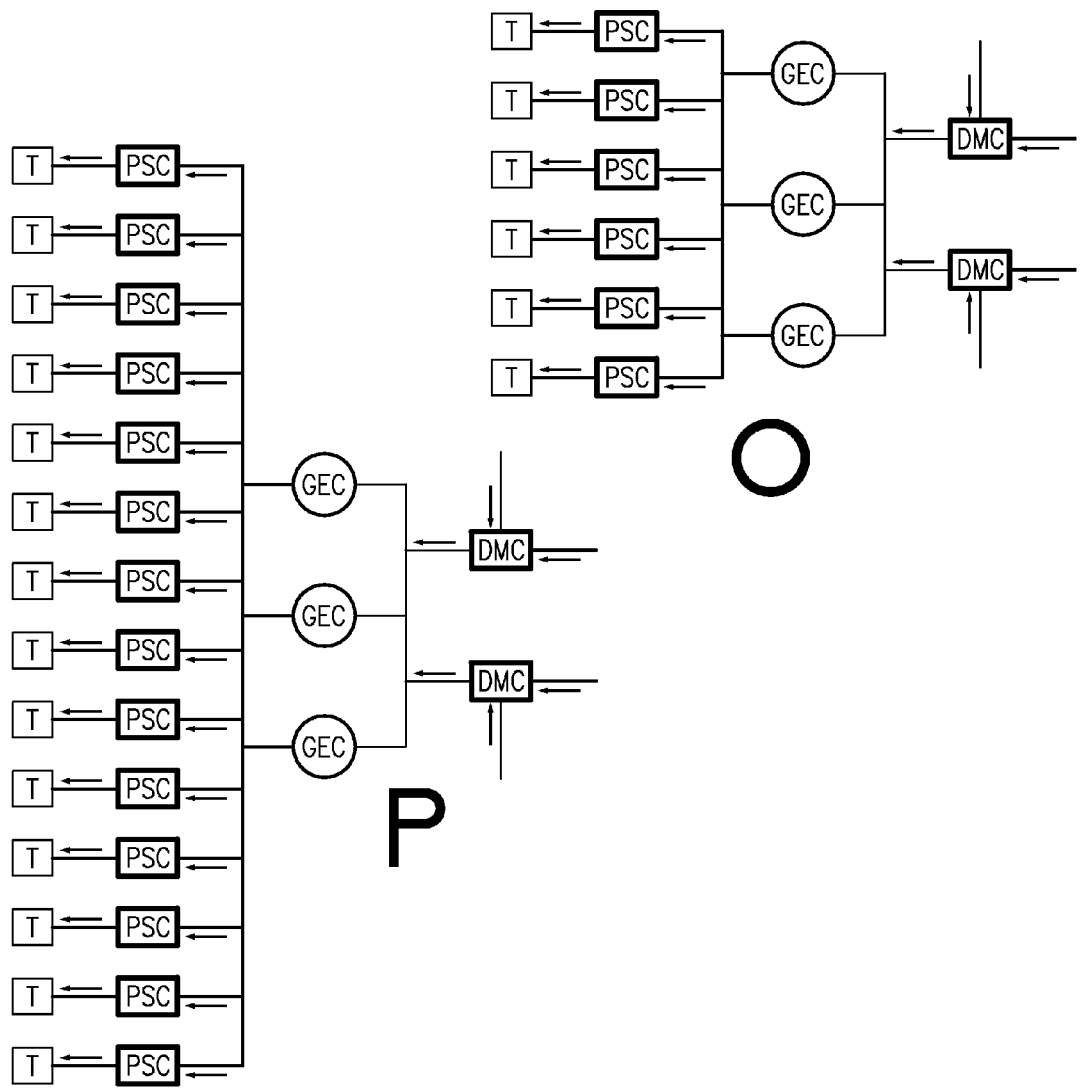
SCHEMATIC LAYOUT EXAMPLES
Drawing No. 22
Various Schematic Examples of System Layouts : O and P

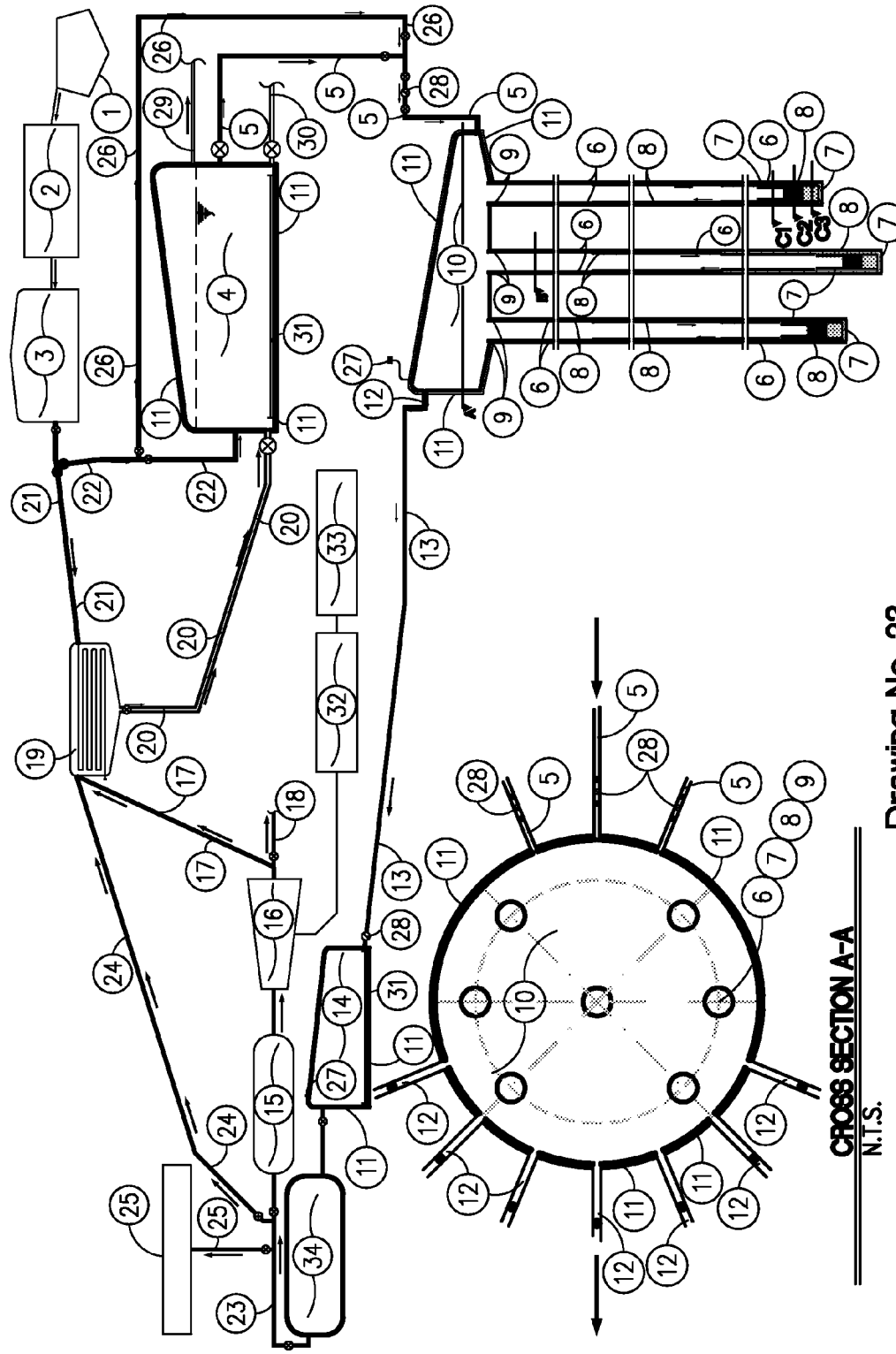

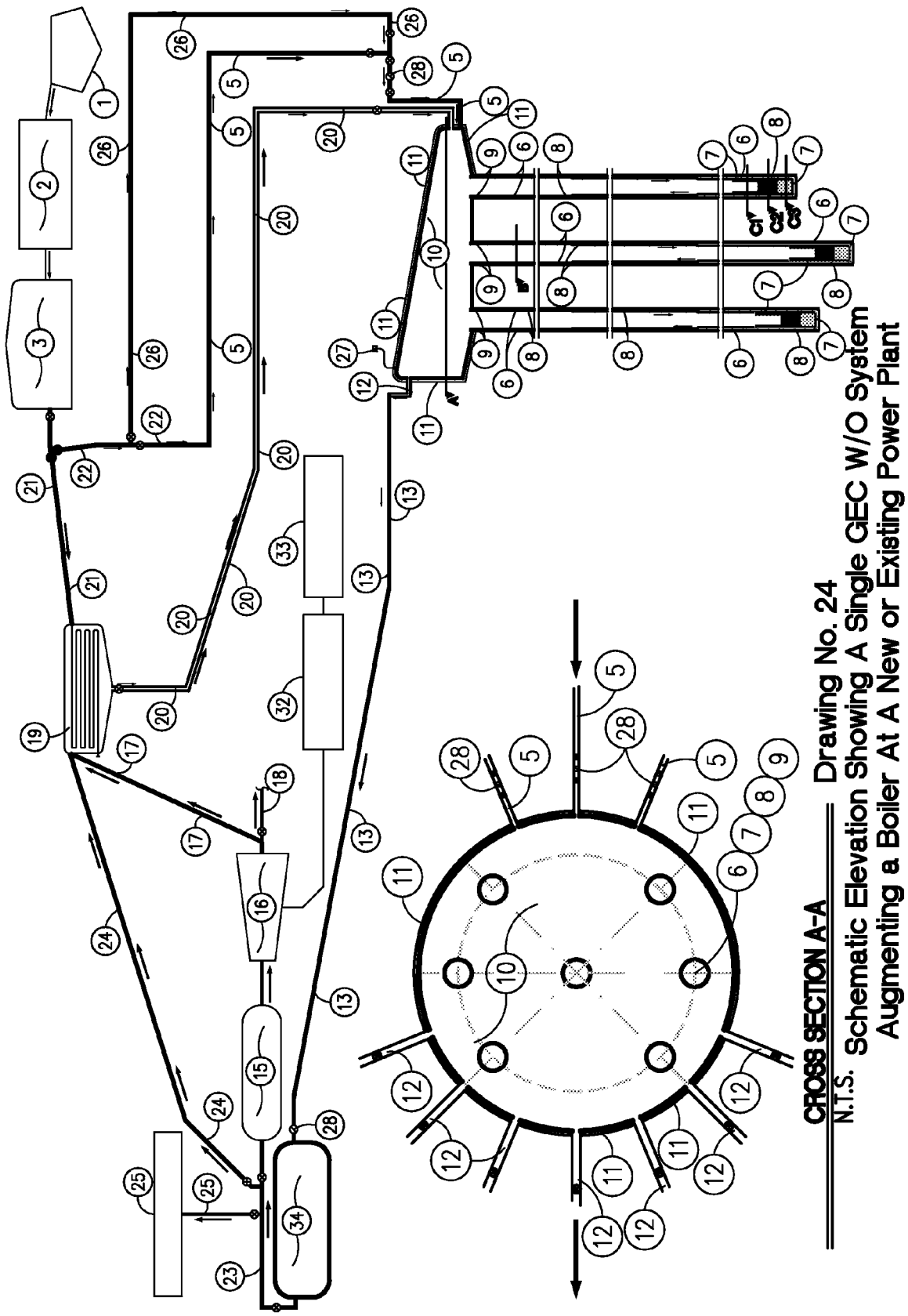

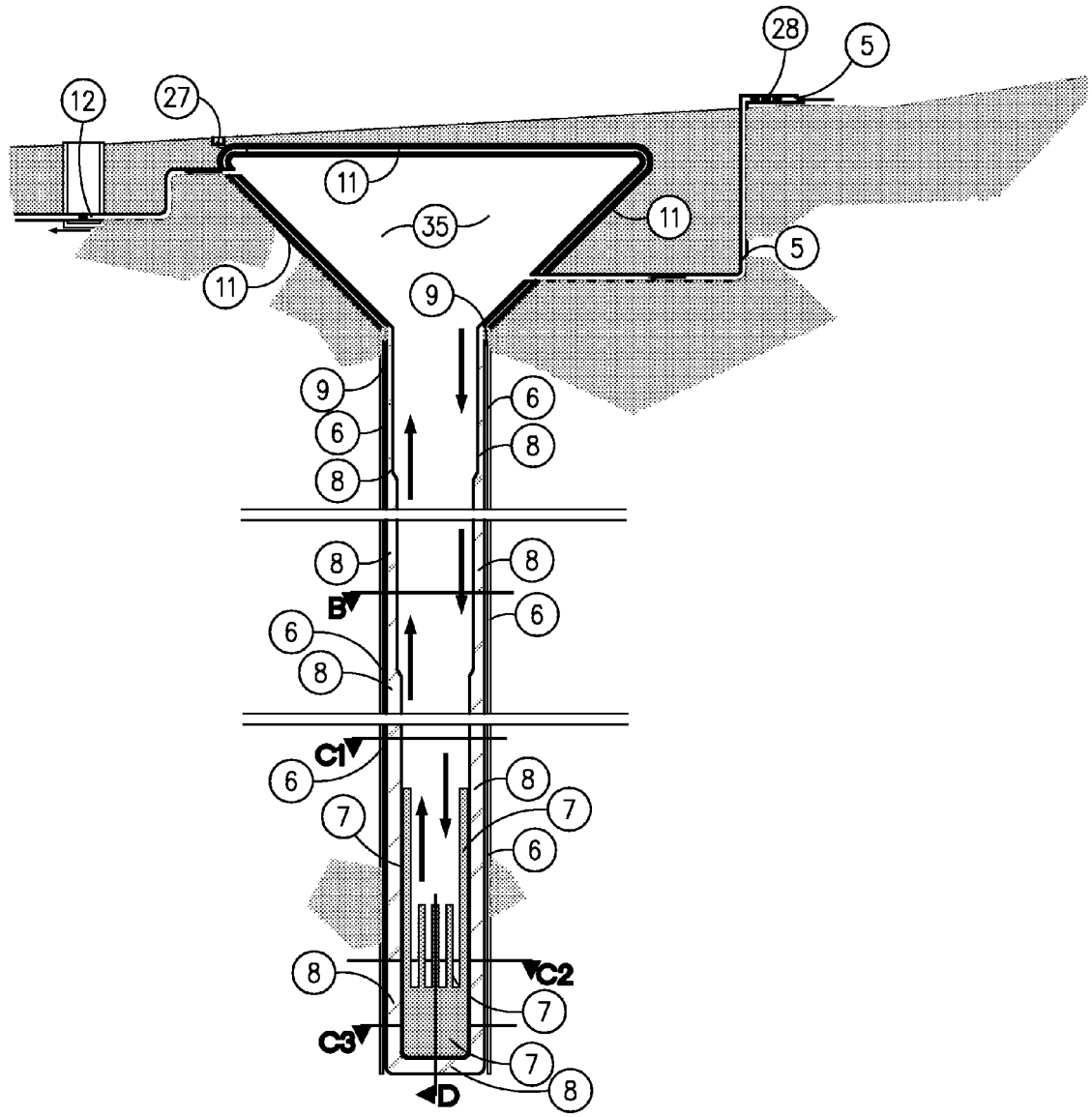
Drawing No. 25
Vertical Schematic Section Thru Geothermal Energy Exchanger
(Shows Thickened Wall With Variable Inside Diameter)

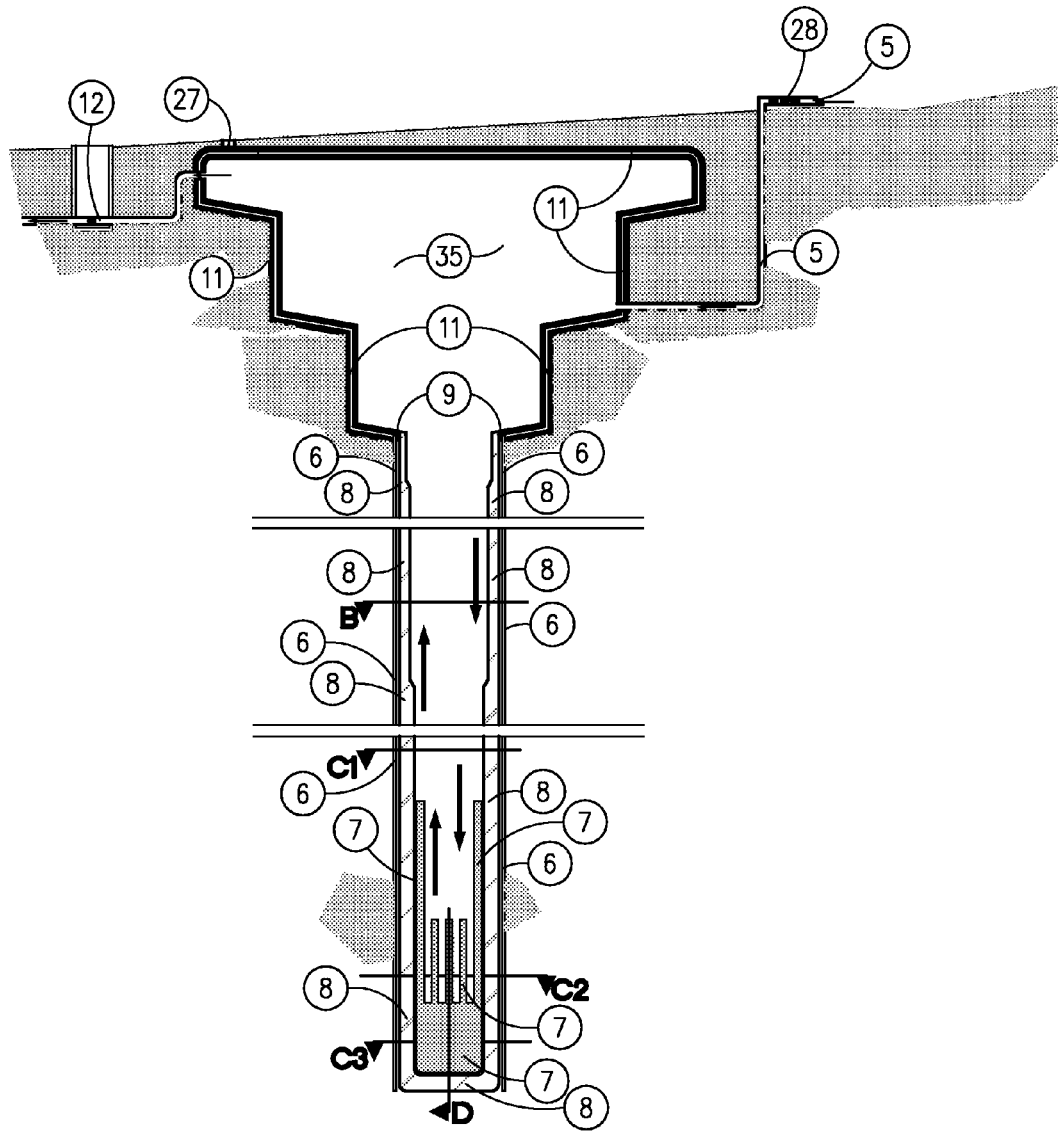
Drawing No. 26
Vertical Schematic Section Thru Geothermal Energy Exchanger
(Shows Thickened Wall With Variable Inside Diameter)

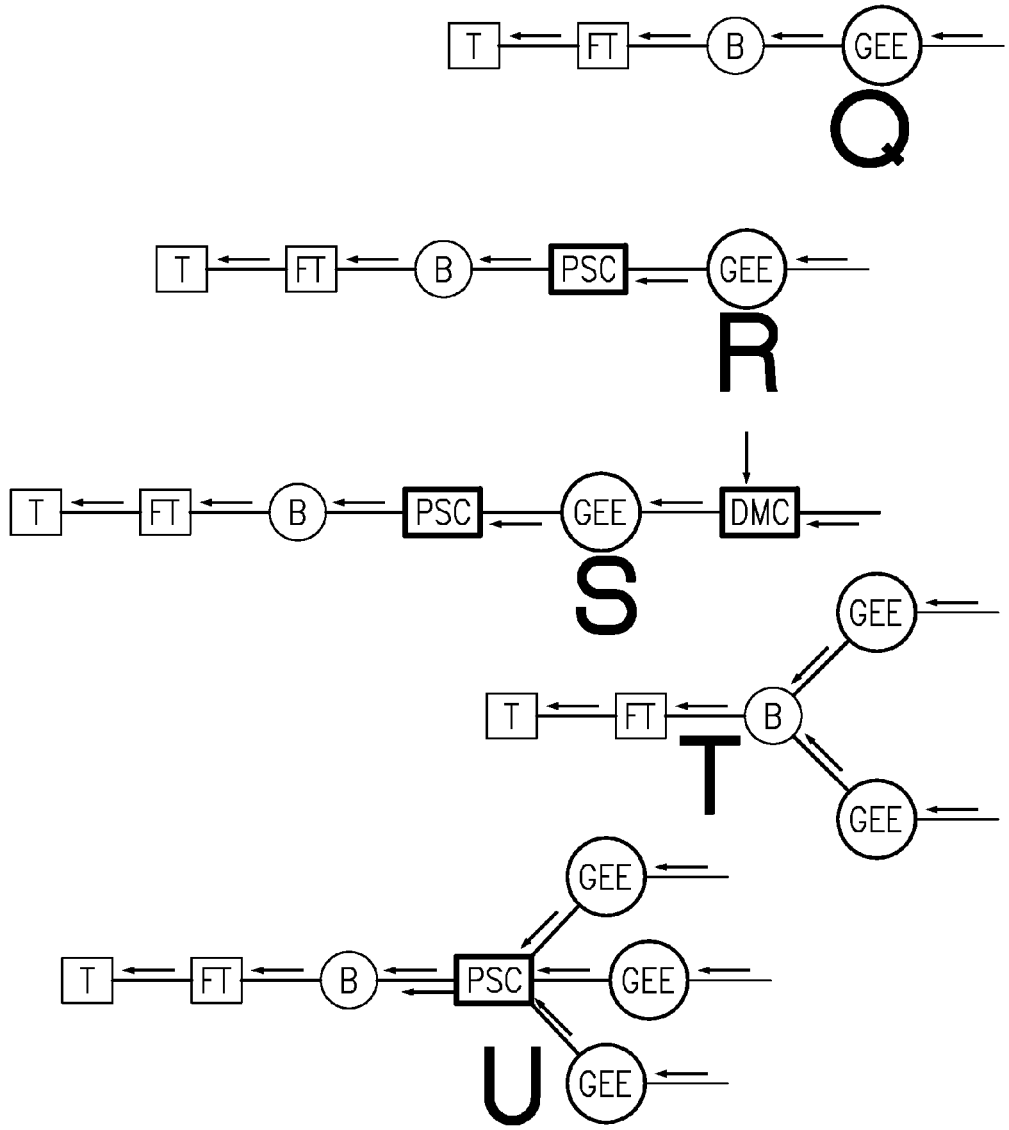
SCHEMATIC LAYOUT EXAMPLES
Drawing No. 27
Various Schematic Examples of System Layouts: Q thru V

GEOTHERMAL ELECTRICITY PRODUCTION METHODS AND GEOTHERMAL ENERGY COLLECTION SYSTEMS

BACKGROUND OF THE INVENTION

Geothermal energy is defined as "heat from the earth". The earth's heat is a "renewable resource" as defined by The National Energy Policy Act of 1992 and the Pacific Northwest Electric Power Planning and Conservation Act of 1980 and is estimated by the U.S. Geothermal Industry for the Renewable Energy Task Force (1997) to be "equivalent to 42 million megawatts of power".

The potential for using heat energy found within the earth, sometimes referred to as "heat mining"; either for direct use or for generation of electricity has been a subject of significant interest over the years. If heat mining could be efficiently and safely employed, geothermal resources could represent a nearly inexhaustible source of non-fossil, non-nuclear fuel.

It should be noted that other so called "green" or "clean" alternative technologies tend to have practical limitations. Electrically powered vehicles currently require electricity for recharging to be generated by fossil fuel or nuclear fuel powered generating facilities.

Pollution is therefore not eliminated and if employed on a large scale demand will drive the cost of electricity to unreasonable levels given current technological limitations.

Large scale implementation of solar collector fields or wind turbine fields will at great cost exert their own environmental impacts, which are at this point undetermined. Additionally, there is the unreliability factor in that the wind doesn't always blow and the sun doesn't always shine and certainly doesn't shine at night. Hydrogen powered vehicles are an exciting alternative, but the large volume of fuel storage required per vehicle makes them impractical at present.

Natural gas powered vehicles are a good stop gap, but natural gas is not renewable, it's expensive and burning it does contribute to so-called green house gases. A natural gas distribution network would have to be created as it does not presently exist in a form suitable for safely fueling individual vehicles on a large scale. Ethanol fuels on any large scale are an environmental and economic disaster worse than gasoline or diesel fuel. Ethanol production is already causing food shortages, which will only worsen as production is increased. Ethanol by the time it is actually grown, harvested, processed and used contributes more green house gases to the atmosphere than gasoline or diesel fuel.

Utilization of geothermal energy in North America goes back 10,000 years. The Paleo-Indians were known to use geothermal hot springs for warmth and cleaning by direct use. More recently geothermal energy has been utilized for a number of things such as producing electricity, heating buildings, streets and sidewalks and for food processing.

With regard to generation of electricity the first sizable geothermal electricity generating plant was constructed in Larderello, Italy in 1904. The Larderello plant is still operational today. The first U.S. commercial geothermal power plant, called "The Geysers" in California began operation in the 1960's. The Geysers system is today considered to be the largest single, renewable energy source in the world.

The United States currently adds up to 2,800 megawatts of electricity to the grid annually via geothermal means. This is a small portion of the annual U.S. production. Uncertainty regarding the availability, renewability and cost of conventional fossil fuels along with potential thermal and environmental pollution, in conjunction with national security concerns, makes the production of electricity using geothermal heat an attractive alternative. This alternative has not, unfortunately, been without its own issues and costs.

Generally speaking, the temperature of the earth's crust increases with depth at an average rate of 3° C. per 100 meters of depth. To harness this heat energy at useful temperatures, say higher than 150° C. under normal crust conditions requires drilling to great depth with a significant cost of investment. To reach below ground temperatures of 300° C. to 400° C. is even more costly. There are, however, geographic regions having pronounced geologic, or more importantly, geothermal anomalies, which can provide access to usefully high temperatures at relatively shallow depths. Heat energy can be mined in these areas at significantly reduced cost if done in an appropriate and safe manner.

Employing current relevant art forms geothermal heat energy is typically extracted by pumping directly from an underground geothermal reservoir or indirectly from the geothermal source, say hot dry rock (HDR), by pumping extraneous water under high pressure through the hot rock to create a below ground reservoir. This may involve first fracturing the rock to make it more permeable should the existing rock not be in a sufficiently fractured condition. Water is typically pumped into the reservoir through a supply well. Hot water or steam is removed from the reservoir through a return well. The water is heated by the geothermal source as it passes through the fractured hot rock reservoir from the supply well to the return well. This type of system is currently employed in Iceland.

Via the return well the heated water is pumped or in the case of steam rises convectively to the surface where its useful thermal energy is used directly or can be converted to electrical energy. After using, the water may be re-circulated back to the reservoir to mine more heat or may be wasted. These fluids can be used for direct heating of structures, for food processing or more frequently for the generation of electricity using a steam turbine. Depending primarily on available temperature the type of electric generating plant may be a flash, dry steam or binary plant. The Geysers in California is a dry steam field, which is quite rare. In a dry steam field, steam, not fluid shoots up the well and powers the turbine.

What are some of the issues? A number of patents are referenced at the beginning of this specification. These patents clearly demonstrate the types of difficulties encountered in attempting to mine geothermal heat energy. The references cited are informational only and do not infer any dependent relationship to claims made herein. As mentioned above geologic formations yielding high temperature rock and/or fluids at shallow depths are economically attractive candidates for heat mining. Unfortunately, many, if not most of these formations are found in tectonically active locations, some of which may experience significant faulting along with earthquake activity and in the case of active volcanoes, may experience flows of molten igneous material or airborne ash and debris. Applying the above mentioned technology inappropriately within such a tectonically active area would be unsafe and from an investment standpoint would have to be characterized as high risk. The careful selection of safe geothermally productive sites is critical to the future exploitation of geothermal energy in any form.

A second issue in various locations is a legal one. Some geothermally active formations are located within scenic areas or even within national parks such as Yellowstone National Park. These areas are inviolate. For example per the Geothermal Steam Act of 1970 and as amended in 1988 "certain lands, including lands within units of the National Park System are closed to federal geothermal leasing".

Another significant and potentially costly issue involves the direct use of geothermal fluids as is typical today. These below ground geothermal fluids; sometimes called brines due to their high mineral content can contain other potential contaminants such as sulfur, boron, mercury and arsenic. Geothermal fluids can be highly corrosive and the direct use thereof can be damaging to equipment. This has resulted in a number of new patents over the years directly related to improving equipment usability and reliability as well as to develop processes for removing the contaminants prior to use or after using. The direct use of fluids pumped from geothermal reservoirs has been costly from an anti-corrosion standpoint, but perhaps even more so by limitations as to actual extent of "renewability", which in some ways becomes the most significant issue regarding future investment in geothermal energy.

There is no question that underground geothermal reservoirs are completely renewable as long as rain continues to fall above ground and the earth's core remains hot. There are, however, serious limitations on the rate at which these insitu fluids can be removed from the reservoir and replenished. If geothermal fluid is removed from the reservoir at a rate higher than that at which the aquifer can recharge itself; the fluid level within the reservoir will drop over time, resulting in a necessary increase in pumping cost at the least and in the worse case a diminishment of the resource for useful purposes.

The situation described above has occurred at The Geysers in California over the last two decades resulting in less fluid being pumped and less electricity being produced. The Geyser problem was largely resolved by the world's first wastewater-to-electricity system (Southeast Geysers Effluent Pipeline), which conveys water from Clear Lake and wastewater effluent from Lake County, both of which are used to replenish the Geysers underground geothermal reservoir(s) so as to increase electric producing capacity. The Geyser's situation then was dealt with by bringing in an outside water source to replenish the receding reservoir levels. This has been an expensive solution.

Another relevant art form simply fractures the hot dry rock if not already fractured sufficiently and pumps water down into the rock fractures under high pressure to be heated and then extracted. This process was touched on earlier. This has been a successful method, but has raised serious questions regarding potential long term environmental effects of artificially injecting large quantities of water into what has historically been dry rock strata. Such systems are employed in Iceland and have been in use for a long period of time both in the generation of electricity and for direct use in heating and food processing.

The list of problems historically associated with the use and harvesting of geothermal energy sources is not particularly long. It is none-the-less a serious list posing rather costly solutions.

In determining whether a geothermal electric generating plant should be built and in determining the size of the plant to be built; a cost-benefit analysis must be performed. A major component of this analysis is the estimated future revenue to be generated through the sale of electricity produced both to pay back the initial capital investment as well as to provide a reasonable dividend to shareholders. Uncertainty with regard to future reservoir levels means uncertainty with regard to future electricity production, which means uncertainty with regard to future revenue, which in turn means increased risk of investment. The investment required is substantial.

Given the uncertainty of maintaining underground reservoir levels and the high cost of recharging levels with pumped surface water; it would reduce risk significantly if there were a way to by-pass or eliminate the direct use of geothermal brines altogether.

One last complication regarding direct use of geothermal fluids is environmental. Vaporization of these geothermal fluids to drive a steam turbine and subsequent condensation back to liquid tends to bring contaminants out of solution. The direct discharge of this untreated brine back into the reservoir or to a local river or lake can result in environmental pollution. Treatment of this brine then becomes an additional cost.

Direct discharge of un-cooled geothermal brines to a lake or river can result in thermal pollution. This is serious as an increase as small as 4° C. within a water course can be fatal to many fish and harmful to aquatic plants. Some geothermal electricity generating plants reinject the treated brine back into the underground reservoir. Some plants cool and waste the treated brine to a local water course. In either case both treatment and cooling of vast quantities of geothermal fluid add significantly to the cost of electricity production by existing geothermal means. Added cost is always added financial risk.

Environmental concerns regarding the discharge of so-called green house gases to the environment are continuing to increase, at least within developed nations. Jurisdictional regulation continues to impose increasingly rigorous standards intended to reduce these discharges. The electrical power industry is said to contribute approximately ⅓ of these so-called green house gases as a result of fossil fuel combustion. At present, more than fifty percent of electric power generation is fueled by fossil fuels such as coal and natural gas. It would be helpful if an effective means of providing phased improvements were available to assist power generating plants in meeting these more stringent regulatory requirements.

BRIEF DESCRIPTION OF THE SEVERAL DRAWINGS

DRAWING 1: Shows a Geothermal Energy Collector (GEC) within the Geothermal Fluid Heating or Steam Production System within the overall Electricity Production Method. A cross section A-A through the GEC Exchange Chamber is also included.

DRAWING 2: Shows a vertical cross section taken through a Geothermal Energy Collector (GEC) with heat exchange cylinders having a variable inside diameter and having a "below ground" exchange chamber.

DRAWING 3: Shows a vertical cross section taken through a Geothermal Energy Collector (GEC) with heat exchange cylinders having a variable outside diameter and having an "above ground" exchange chamber.

DRAWING 4: Shows cross section A-A taken through a Geothermal Energy Exchanger (GEC) exchange chamber served by seven (7) heat exchange cylinders. This section clearly shows the preferred redundancy of multiple inlets and outlets.

DRAWING 5: Shows cross section B-B taken through the upper portion of a heat exchange cylinder, that is, the portion above the heating core. Surrounding soil or rock, the optional protective casing and the cylinder itself are shown. Insulation is not shown.

DRAWING 6: Shows cross section C-C1 taken through the ring (upper) portion of a heating core. Surrounding soil or rock, optional protective casing, heating cylinder wall and heating core are visible.

DRAWING 7: Shows cross section C-C2 taken through the perforated (middle) portion of a heating core. Surrounding soil or rock, optional protective casing, heating cylinder wall and perforated heating core are visible.

DRAWING 8: Shows cross section C-C3 taken through the solid (bottom) portion of a heating core. Surrounding soil or rock, optional protective casing, heating cylinder wall and solid heating core are visible.

DRAWING 9: Shows vertical cross section D-D taken through the sealed bottom of a heat exchange cylinder for the purpose of depicting the upper (ring), middle (perforated) and bottom (solid) portions of the highly conductive heating core. The surrounding soil or rock and the optional protective casing can also be seen.

DRAWING 10: Shows top views of two possible exchange chamber layouts. GEC-1:17 depicts a single exchange chamber connected to 17 heat exchange cylinders. GEC-1:33 shows a possible exchange chamber layout connecting to 33 heat exchange cylinders.

DRAWING 11: Shows top views of two possible exchange chamber layouts. GEC-1:135 depicts a single exchange chamber connected to 135 heat exchange cylinders. GEC-1:238 shows a possible exchange chamber layout connecting to 238 heat exchange cylinders.

DRAWING 12: Shows a top view of one possible higher capacity exchange chamber layout. GEC-1:524 depicts a single exchange chamber connected to 524 heat exchange cylinders.

DRAWING 13: Shows a top view of another possible higher capacity exchange chamber layout. GEC-1:708 depicts a single exchange chamber connected to 708 heat exchange cylinders.

DRAWING 14: Shows a top view of one possible, very high capacity exchange chamber layout. GEC-1:1,035 depicts a single exchange chamber connected to 1,035 heat exchange cylinders.

DRAWING 15: Shows a Geothermal Energy Exchanger (GEE) within the Geothermal Fluid Heating or Steam Production System within the overall Electricity Production Method.

DRAWING 16: Shows a vertical cross section taken through a Depressurized Mixing Container (DPC). The typical free fluid surface at atmospheric pressure can be seen as well as the auxiliary heating element and insulation along with inlet, outlet and overflow piping. The drawing does not specify, but this container can be constructed above or below ground.

DRAWING 17: Shows a vertical cross section taken through a Pressurized Storage Container (PSC). The auxiliary heating element, insulation, pressure sensor and pressure relief valve along with inlet and outlet piping is visible. The drawing does not specify, but this container can be constructed above or below ground.

DRAWING 18: Shows a vertical cross section taken through an exchange chamber. The inlet and outlet piping, insulation and pressure sensor/pressure relief valve are visible. Also visible are heat exchange cylinders coming into the bottom of the exchange chamber.

DRAWING 19: Shows six possible conceptual layouts (A thru F) for the Geothermal Fluid Heating or Steam Production System.

DRAWING 20: Shows six possible conceptual layouts (G thru L) for the Geothermal Fluid Heating or Steam Production System.

DRAWING 21: Shows two possible conceptual layouts (M and N) for the Geothermal Fluid Heating or Steam Production System.

DRAWING 22: Shows two possible conceptual layouts (O and P) for the Geothermal Fluid Heating or Steam Production System.

DRAWING 23: Shows a single Geothermal Energy Collector (GEC) within the Geothermal Fluid Heating or Steam Production System augmenting or adding heat to boiler fluid within the Geothermal Heat Energy Method.

DRAWING 24: Shows a single Geothermal Energy Collector (GEC) without the Geothermal Fluid Heating or Steam Production System augmenting or adding heat to boiler fluid within the Geothermal Heat Energy Method.

DRAWING 25: Shows a vertical cross section taken through a Geothermal Energy Exchanger (GEE). The single heat exchange cylinder and volumetric top section of the GEE are visible along with other intrinsic elements and the inlet and outlet piping. A pressure sensor and pressure relief valve are also shown.

DRAWING 26: Shows a vertical cross section taken through a Geothermal Energy Exchanger (GEE). The single heat exchange cylinder and another type of volumetric top section of the GEE are visible along with other intrinsic elements and the inlet and outlet piping. A pressure sensor and pressure relief valve are also shown.

DRAWING 27: Shows five possible conceptual layouts (Q thru U) for the Geothermal Heat Energy Method demonstrating that the Method can be used without the Geothermal Fluid Heating or Steam Production System or can be used with some or all of the elements of the Geothermal Fluid Heating or Steam Production System. At least one GEE must be included for the Method to work.

BRIEF SUMMARY OF THE INVENTION

Two Devices, a System and two Methods are hereby invented to conductively harness and make available within a closed loop, through a combination of pumped, gravity driven and convective steam and/or fluid flow "renewable and sustainable" heat energy obtained from hot geologic rock strata, geothermal reservoirs or any other subterranean heat source for the purpose of directly performing useful work or for converting such harnessed heat energy to some other form of useful energy, such as electricity. The methods, system and devices eliminate entirely the need for any direct contact with or exposure to geothermal fluids, gases or any other potentially contaminated material.

One device referred to as the "Geothermal Energy Collector" (GEC) and a second device referred to as the Geothermal Energy Exchanger (GEE) have no moving parts below ground so can be more safely utilized in many if not most geothermally active areas. The GEC is composed of an upper exchange chamber fed by multiple heat exchange cylinders or heat sources and usually, but not always requires an insulated Depressurized Mixing Container (DMC) for pre-thermal mixing, heat/pressure control and supply storage; along with an insulated Pressurized Storage Container (PSC) to receive, store and final adjust the heated fluid or steam. It is possible for the insulated GEC itself to serve all three of these functions in some situations. A device having an upper exchange chamber fed by multiple heat exchange cylinders or heat sources would be considered a GEC not a GEE. The upper exchange chamber of the GEC makes it possible to harness multiple heat sources using multiple heat exchange cylinders each of which may vary in diameter, shape, depth, temperature and volume of output.

The GEE is always a single heat exchange cylinder of any size, diameter, shape or depth, which generally, but not always has an expanded, volumetric upper portion or top. The GEE is a somewhat simpler device requiring less capital investment than the GEC. In any event both the GEC and the GEE can work within or without their system, which typically includes the Depressurized Mixing Container (DMC) and/or the Pressurized Storage Container (PSC) along with associated appurtenances.

The DMC is referred to as "depressurized" because it will normally have a "free water surface" within the container at normal atmospheric pressure. There may, however, be circumstances where this container would not be at atmospheric pressure, but would be pressurized. In any event the DMC will have an auxiliary heating element powered by the method to assist with temperature control and pre-heating when necessary.

Suitable recipient forms of useful work might be to power an electricity producing generator with a steam turbine or to provide heated fluid for the heating of buildings or other structures, for cold weather hydroponic farming, pasteurization, food processing, canning, smoking of food products, production of hydrogen fuel or some other appropriate work, which can make use of the energy embodied within heated, energy laden liquid, vapor or steam as can be provided by these methods, system and devices. Generally speaking, however, if electricity is to be generated and supplied by this embodiment, then other more direct uses of the heated fluid or steam would be expected to be comparatively uneconomical.

The devices, system and methods strive to maximize the use of gravitational forces in such a manner and where possible so as to make practical use of the height, weight and greater density of relatively cooler temperature fluids to cause a settling action or flow of fluid generally downward within the GEC or GEE itself or as may be driven by fluid pressure to some other portion of the associated system being fed by the GEC or GEE—in conjunction with buoyant forces acting on relatively more heated, less dense fluids or steam such as emanating from the heated sides and bottom core region of any heat exchange cylinder or as with steam exiting a steam turbine to the condenser, causing in either case a rising action or flow of fluid or steam generally upward within the GEC or GEE device itself or within the steam collector exiting to a condenser. The system is not likely to eliminate pumping, but when topographic site conditions are optimum, some pumping costs may be eliminated or reduced.

Within the system as a whole, the direction and rate of flow is controlled and driven by the difference in pressure within various components of the system, whether vertical, inclined or horizontal so as to generate and maintain a controlled, dependable, steady flow regime, usually within or as part of a renewable geothermal environment. After use the fluid is returned to the depressurized mixing container (DMC) for reuse. Overall, the GEC or GEE, within their associated system working cooperatively to serve other existing technologies, such as a steam turbine used to generate electricity comprises either "The Geothermal Electrical Production Method" or "The Geothermal Heat Energy Method", depending on the application, which circulates and makes available for use within a closed system, conductively heated, convectional, gravity driven or pumped fluid and/or steam flow thereby providing a cost efficient, dependable and sustained means of using fluid, vapor or steam energy to perform useful work; to add heat to any existing process, such as a power plant boiler or to be converted into other usable forms of energy, such as electricity.

The fluid used within the closed system can be any suitable fluid, but is most likely to be purified, treated water or chemically altered water. For example it is possible to chemically treat water with various additives or catalysts so as to reduce or otherwise alter its vaporization characteristics. The nature of the fluid employed within the system or the phase of the fluid, say liquid or gas, in no way impacts or alters the preferred embodiment of this invention. Assuming gravitational forces are present at a particular site location the system and its device(s) are able to accommodate liquid, vapor or steam flow. As noted elsewhere the liquid or gas phase is temperature and pressure dependent.

The methods are always, or are at the least generally, comprised of a highly specific, singularly designed arrangement of devices, equipment and appurtenances placed vertically and horizontally relative to one another and connected together within a specific location so as to effectively use local topographic features in maximizing the use of gravitational force. This reduces the need and cost of circulatory pumping to the maximum extent possible within the system. It should be noted as a matter of course, that the overall system and method make extensive use of different types of sensors, alarms, telemetry systems, pump systems, backflow valves, various types of flow control valves, pressure regulating valves, traps and check valves throughout. It should also be noted that all piping, containers, tanks, devices, equipment and appurtenances employed within the overall methods including the DMC, GEC, GEE and PSC devices themselves should be of materials that are corrosion resistant and of construction type suitable for use with high temperatures and pressures and should be insulated appropriately to minimize heat energy losses.

The DMC should be insulated against heat losses although its relative temperatures are expected to be lower than in the GEC, GEE or PSC. The DMC is also to be fitted with auxiliary heating elements to provide better heat control during the pre-heating and thermal mixing phase. The DMC contains flow level and temperature sensors along with overflow discharge controls and a maintenance drain. In cases where the DMC would actually be pressurized, it will be fitted with pressure sensors and pressure relief valves, but would not require the overflow drain. The PSC also contains internal heating elements along with various temperature and pressure sensors, pressure relief valves and a maintenance drain.

The preferred embodiment enables either of the overall methods; say in the case of steam turbines used to power the electrical generation of electricity to completely eliminate the need for burning fossil or nuclear fuel to create steam and also considerably reduces the corrosion and maintenance problems associated with direct use of geothermal brines as is the case with most current art forms. The GEC, GEE and/or their system can also be used to simply augment an existing power plant boiler by pre-heating the boiler supply fluid. In this case the use of fossil or nuclear fuel would be reduced, not eliminated.

The complete elimination of fossil fuel combustion enabled by this embodiment can eliminate the typical fossil fuel powered plant discharge of so called green house gases to the environment. Using the GEC, GEE and/or their system to simply augment or pre-heat the supply fluid for an existing power plant boiler will effectively offer a partial reduction of such emissions, but not a complete elimination. This augmented type of use lends itself to a budgeted, phased retrofitting of existing power plants to meet ever more stringent environmental and/or regulatory discharge standards for carbon or other elements.

The GEC, GEE and their system can eliminate or reduce the burden of mining, transporting and storing fossil fuels as well as disposing of the incinerated fuel waste. In the case of a nuclear powered electric generating plant the ongoing cost of producing nuclear fuel and disposing of nuclear waste can be reduced or eliminated. The on-going fuel cost of either fossil or nuclear fueled plants can be heavily offset by a one-time system installation of this embodiment capable of utilizing an existing geothermal heat energy source or sources, which never turns off and does not need to be transported overland, stored or disposed of.

The methods enable a system of devices and equipment to completely isolate, excepting any losses, and circulate any suitable heated fluid or steam, such as treated or altered water, so such fluid or steam never comes into contact with the hot rock, geothermal fluid or any other potentially polluting heat source. This isolated fluid is conductively heated in the lower reaches of the heat exchange cylinders via conductive thermal transfer through the container walls and thickened heating core bottom and flows by convection downwards and then upwards as less dense heated fluid or as steam within the heat exchange cylinders, without the use of any internal piping systems, to the upper exchange chamber or in the case of the GEE to its expanded top, where it is then available to be discharged and used for some purpose. After the fluid has been used as heated fluid or steam, it is recaptured and recirculated, usually through a condenser, still quite warm, generally without need for cooling, back to the mixing container (DMC) for return to the upper exchange chamber of the GEC or the top of the GEE for re-heating within the heat exchange cylinders or cylinder and for re-use in a continuous, closed, renewable and sustainable cycle.

These methods and associated equipment employed in conjunction with the system of devices allows for mining geothermal heat on a large scale without the need or cost of continually replacing vast quantities of fresh fluid and without treating and wasting potentially contaminated brines as is the case with current art technologies. The corrosion problem inherent with the direct use of geothermal fluids is eliminated. Environmental and thermal pollution as a by-product of electricity generation is significantly reduced or can even be eliminated. The net efficiency of the overall system is greatly enhanced while operating costs are significantly reduced compared with technologies currently in use. A one-time capital investment in this system and its devices can heavily offset the enormous ongoing operational fuel costs of current power production technology.

This embodiment is basically a vertically, or can be inclined installation able to be constructed using current drilling and excavating technology. It does not have a substantial horizontal below-ground component as most other current art forms do. The current art horizontal component generally required presents significant obstacles to construction when carried out thousands of feet below the surface of the earth. This preferred embodiment eliminates any such below-ground horizontal obstacle.

In order for the methods outlined above to work it was necessary to invent a device referred to as the "Geothermal Energy Collector" (GEC). The GEC is capable of tapping multiple geothermal heat sources. In order for the GEC to function in a multitude of variable applications it also became necessary to invent a System with two additional devices; the "Depressurized Mixing Container" (DMC) and the "Pressurized Storage Container" (PSC). Therefore, we have invented such a device and such a system, which working in tandem are capable of harnessing the earth's heat and transferring it through conduction, convection and pumping to above ground equipment to be used for the production of electricity or for some other use. The PSC or multiple PSC's can be supplied by a single GEC or by a system of multiple GECs, which in turn can be fed by a single DMC or by multiple DMC's. The number and variation of layout possibilities makes the use of this system very flexible. The system's ability to be arranged in many different site specific ways is actually a singular component of the preferred embodiment; not an alternate embodiment.

A second somewhat simpler device served by a single geothermal heat source referred to as the "Geothermal Energy Exchanger" (GEE) has also been invented. Whereas the GEC utilizes multiple geothermal heat sources, the GEE is fed by a single geothermal heat source.

The device referred to as the Geothermal Energy Collector (GEC) consists of a number of non-moving below ground component parts. The GEC will generally utilize many or at least two or more cylindrical heat exchange cylinders having sealed bottoms capable of containing, protecting, conductively heating and convectively flowing any suitable fluid, each of which are installed to a depth sufficient so as to provide the requisite heated fluid temperature for the intended use. A thermally conductive heating core can be installed at the bottom of each heat exchange cylinder to further maximize the rate of conductive heating.

The heating core material can be copper or some other highly conductive material and can be solid, perforated or partially perforated. Lastly, a relatively large diameter, insulated exchange chamber is to be installed at the top of multiple or at least two heat exchange cylinders to facilitate storage, thermal mixing and the exchange of heated fluid or steam with return fluid and purified make-up fluid coming from the DMC. A fourth component can be added if needed; that being a protective casing within which each heat exchange cylinder could be inserted to provide additional protection. These casings may serve both to protect the cylinders as well as to hold the drill hole open should it be necessary.

It should be significantly noted that the upper insulated exchange chamber, which is listed simply as a larger diameter component part of the GEC is actually integral and essential to the GEC in order to provide a volume of any significant scale and to separate cooler, denser incoming fluid from the hotter, less dense outgoing fluid or steam thereby aiding convective flow. Convective flow will occur within each cylinder and also within the exchange chamber as it is fed by the cylinders. The incoming cooler fluid enters near the bottom of the exchange chamber where it is readily available to the tops of the heat exchange cylinders. The heated fluid or steam conversely enters the chamber at the bottom as it convectively rises out of the heat exchange cylinders, and then exits the exchange chamber near the top.

Existing drilling technology limits the diameter of shafts or wells which can economically be driven or inserted deep into the earth. The GEC's exchange chamber is designed to overcome this potentially limiting volume factor associated with existing drilling technology by allowing multiple heat exchange cylinders to be installed, thereby tapping multiple geothermal heat sources. The large diameter of the exchange chamber also serves two important additional functions. The first is to separate the rising heated fluid or steam discharge outlet from the cooler supply inlet. Thermal mixing at the point of discharge would be highly undesirable due to the cooling effect. The second important function is related to maintenance. If the exchange chamber diameter is small then the number of inlet and outlet pipes that can be accommodated is small. Redundancy is important here as having multiple inlets and outlets to an exchange chamber allows maintenance to be performed on one or more supply or discharge lines without taking the GEC out of service.

The device referred to as the Geothermal Energy Exchanger (GEE) is similar to the GEC described above except that it consists of a single heat exchange cylinder tapping a single geothermal heat source. The GEE can have, but is not required to have an expanded, volumetric top section to facilitate and separate the supply of incoming cooler fluid and the discharge of outgoing heated fluid, vapor or steam.

The two additional stand alone devices within the system referred to as the depressurized mixing container (DMC) and the pressurized storage container (PSC) each serve a number of functions. The DMC provides storage volume, mixes make-up fluid with return condensate fluid and can preheat the mixture before sending it to the GEC or GEE. The PSC accepts and stores the heated fluid or steam received from the GEC or GEE and provides a final opportunity for temperature and pressure control prior to supplying a turbine, its phase separator, a flash tank or some other equipment or use. Both these containers should be heavily and effectively insulated against thermal losses.

Insulation for the DMC, GEC, GEE, PSC and even for the heat exchange cylinders can be ceramic as is typically used in power plants or can be any other suitable insulating material. It should be noted here that the GEC or the GEE can be constructed above, below or partially below ground. In an industrial plant setting an above ground or partially buried installation may make sense. In a more sensitive environmental setting a below ground installation might be more appropriate. In either case the ground itself is an insulating factor and may play a safety role or even a protective role from a security standpoint.

Prior art adequately addresses the matter of geothermal energy transference on a small scale, but none so far cost effectively provides for any significant mass or volume of heated steam or fluid as is required for commercial applications. A steam turbine of economically viable size requires enormous amounts of steam to operate efficiently. The large diameter insulated exchange chamber at the top of the GEC along with an appropriate number of heat exchange cylinders to supply it provides the necessary volume of heated steam or fluid to serve large capacity turbines and working within the system does so at a regular, dependable flow rate at temperatures and pressures which can be accurately controlled.

By maintaining a relatively large volume of heated fluid or steam within the system at all times as occurs within the large diameter insulated exchange chamber, and even more so when the combined volumes of the DMC and PSC are added; the amount of purified fluid added to the GEC for heating as received from the DMC is always a small percentage of the overall heated volume and therefore heats relatively quickly. It should be noted that one function of the DMC is to pre-heat fresh purified make-up fluid by mixing it with already warm return condensate, which results in a pre-heated fluid the overall temperature of which requires less heating by the GEC to reach requisite temperatures. The internal DMC heating elements provide additional temperature control for the system. This pre-heating function enhances overall system efficiency, significantly reduces the time required for fluid heating to take place and enables large volumes of heated fluid to be maintained and to be available to the turbines per any unit of time. Thus the volume issue is singularly addressed by this invention. No prior art has suitably addressed the issue of creating an environmentally friendly, economically viable, closed cycle system, utilizing conduction and convection for mining geothermal heat.

This concept of adding only small quantities of cooler fluid to relatively large quantities of heated fluid applies just as well for the GEE, whether or not a particular GEE is employed within or without its system of support devices and appurtenances. Generally speaking, the GEE is intended as a cost effective heat augmentation device aptly suited to reducing the use of fossil or nuclear fuels at an existing power plant. The GEE can be employed at a new power plant, but the GEC would be expected to be more economically viable for new applications.

The component parts of the device hereinafter referred to collectively as the "Geothermal Energy Collector" (GEC) more specifically consists of two or more heat exchange cylinders each having a thickened bottom heating core of significant mass. Although smaller than the overall cylinder length or depth, the heating core is typically metal such as copper, but can be of any other material having very high thermal conductivity characteristics and acceptable thermal coefficients of expansion and contraction. The heat exchange cylinders can be of some other appropriate shape, but a cylinder provides maximum volume. The heat exchange cylinders are installed into drilled wells, with or without protective casings, to a depth of suitable temperature; with any annular space between the heat exchangers and the surrounding soil or rock and the casing, if used, to be effectively sealed or appropriately grouted near the top. Such sealing is provided to inhibit the unwanted discharge of undesirable gases or fluids from being leaked into the environment. The upper, larger diameter, effectively insulated exchange chamber located at the top of two or more heat exchange cylinders enhances the heated fluid or steam volume available to the system and serves to equalize or balance the temperature and pressure of heated fluid or steam exiting the individual heat exchange cylinders Within the preferred embodiment of the GEC there are no pumps, no valves and no moving parts internal to the device as is typically found in other relevant art forms. The GEC will normally work within a system with two other devices, the DMC and PSC. This system of three devices along with any appurtenances then works within one of two overall methods comprised of other equipment and appurtenances such as a chemical additive system, treatment system, purification system, boiler, steam turbine or turbines, an electrical power generator, condenser, possibly a phase separator or flash chamber, connecting pipes and valves, sensors of various kinds and bleed-off traps all together comprising either the "The Geothermal Electricity Production Method" or "The Geothermal Heat Energy Method" employed for the purpose of harnessing, circulating, using and then recirculating geothermally heated fluid or steam, within an enclosed, non-polluting environment, to generate electricity and supply it to a grid or to perform some other work.

The component parts of the second device hereinafter referred to collectively as the "Geothermal Energy Exchanger" (GEE) are similar to those described for the GEC above excepting the following differences. The GEE is served or fed by only one heat exchange cylinder or heat source. It therefore does not require an exchange chamber at the top. The GEE's single heat exchange cylinder can be of constant size or diameter or it can vary. The cylinder can be installed within a casing or not. An expanded volumetric top section, something less than a GEC exchange chamber, can be employed to facilitate volume of storage, input and output, but is not required. Similarly, the heating core can be fully installed, minimized or even deleted. A GEE remains a GEE whether or not it utilizes a heating core or a casing and irrespective of its shape or size.

The GEE typically works within the "Geothermal Heat Energy Method" employed to augment or supplement heated fluid fed to an existing power plant boiler. It requires less capital investment than a GEC, which makes it an attractive retrofit technology for plants needing to comply with more strict environmental discharge standards. It should be noted, however, that in the future it may be possible to construct a GEE having an enormous heat cylinder diameter. This would then compete favorably with the GEC in terms of cost efficiency. In any case, the GEE can also be utilized within the "Geothermal Electrical Production Method", but will generally not be competitive with the GEC in that application.

To reiterate, the two methods consist of a system of devices and their associated appurtenances working in conjunction with other existing technologies and equipment connected together in such a way so as to provide the requisite product volume of isolated, heated fluid, vapor or steam to any user process, existing or new. The relative horizontal and vertical arrangement of the devices and equipment to each other within the system and methods is important and cannot be haphazard; however, the arrangement, if properly designed can be almost infinitely variable in adjusting to local topographic conditions, geothermal formations and a user's specific needs. One arrangement or another of devices and equipment does not constitute a departure from the preferred embodiment. The use of some other fluid, such as ammonia does not constitute a departure from the preferred embodiment.

It should be noted that a properly defined and regulated "start-up" procedure is mandatory with the use of this system and methods to effectively serve any use and to avoid possible damage to any of the component parts of the methods, as say to a steam turbine. A start-up procedure is discussed in the following Detailed Description of the Invention.

Geothermal heat energy, should it be harnessed by such devices as described here, within such a system and methods as described herein, is capable of producing enough electricity to satisfy a significant portion of the future consumptive demand of the North American continent with minimal, if any discharge of so-called greenhouse gases.

On a lesser scale, a very important retrofitting application of these devices and their system may be to augment or add heat to the boiler supply fluid at appropriate steam turbine driven electricity generating plants. By mining geothermal heat and using it to pre-heat and increase the temperature of fluid entering the boiler at a power plant the amount of fossil or nuclear fuel energy required to create steam would be reduced, thereby providing both cost and environmental benefits.

DETAILED DESCRIPTION OF THE INVENTION

This invention, the GEOTHERMAL ENERGY COLLECTOR (GEC) 6, 7, 8, 9, 10; the GEOTHERMAL ENERGY EXCHANGER (GEE) 6, 7, 8, 9, 35 along with the GEOTHERMAL FLUID HEATING OR STEAM PRODUCTION SYSTEM; the GEOTHERMAL ELECTRICITY PRODUCTION METHOD; the GEOTHERMAL HEAT ENERGY METHOD and their use as shown in Drawings 1, 15, 23, 24, 25, 26 and 27 appropriately employed along with existing technologies and equipment, altogether comprising "the methods" allows any suitable, isolated and confined fluid, such as treated water, water modified by additives and/or catalysts or steam to be supplied 5, circulated below ground and conductively heated within the heat exchange cylinders 8; then to be discharged 12 providing steam to steam turbines 16 or heated fluid for some other use 25; then to be condensed 19 if necessary and returned or recirculated 20 back to the mixing container 4 for reuse within an enclosed, non-polluting system. Within the preferred embodiment fluid, vapor and/or steam flows are driven by gravity, convection, buoyant forces, differential elevation head and pumping with no exposure to outside contaminants.

The GEC 6, 7, 8, 9, 10 and its system provide a great deal of flexibility and as shown on Drawing 23 the GEC 6, 7, 8, 9, 10 and its system can be used to fully supply or to augment or add heat or to pre-heat the supply fluid entering a new or existing power plant boiler 34. Drawing 24 shows that the GEC 6, 7, 8, 9, 10 can in some situations be used by itself, with all or part of its system omitted as it 6, 7, 8, 9, 10 is used to add heat to any process or to pre-heat supply fluid entering a new or existing power plant boiler 34. A GEC 6, 7, 8, 9, 10 is a device constructed so as to have multiple heat sources, each of which is mined via a heat exchange cylinder and all of which feed into an exchange chamber mounted at the top of the multiple cylinders. A GEE 6, 7, 8, 9, 35 is similar to a GEC 6, 7, 8, 9, 10, but only has a single heat exchange cylinder mining a single heat source. A GEE 6, 7, 8, 9, 35 as depicted in Drawings 25 and 26 could be substituted in place of the GEC in both Drawings 23 and 24 thereby offering the option of a lower capital cost, phased solution.

A clarification regarding operational redundancy and the readability of this detailed description must be made here. The invention herein described consists of two devices; a GEC 6, 7, 8, 9, 10 and a GEE 6, 7, 8, 9, 35 to be employed for mining heat from within the earth; a geothermal system for producing heated fluid, vapor or steam and two methods, one for producing electricity or for some other 25 direct or indirect use and a second for adding heat to any system such as a power plant boiler 34. Practical system design requires that various equipment, devices, piping, valving, etc. be duplicated in a redundant fashion so that maintenance can be performed on any part of the system without taking the entire system out of service.

This generally requires duplication of DMC's 4, GEC's 6, 7, 8, 9, 10, GEE's 6, 7, 8, 9, 35, PSC's 14, turbines 16, piping, etc. In order for this detailed description to remain readable any reference to a DMC 4, GEC 6, 7, 8, 9, 10, GEE 6, 7, 8, 9, 35, PSC 14, turbine 16 or any other device, equipment or appurtenance shall be assumed by the reader to possibly be plural or at least more than one. This system must always be custom designed to fit effectively within or on any particular site. The actual numbers and arrangement of any elements, devices or equipment utilized within these methods and system is not limiting or exclusive with respect to the preferred embodiment herein described. Conversely, the deletion within the system of any element, device or equipment as described herein does not constitute a departure from the preferred embodiment. The preferred embodiment is by its nature and intent flexible in design.

In the case of treated or purified water as the heated fluid, water can be supplied to the site from any available source 1, treated 2, stored 3 and conveyed 5 to the mixing container 4. Drawings 1, 15, 23 and 24 show a schematic layout of the system, which can operate within either overall method. Within the mixing container 4 this fresh, cold fluid 22 is mixed with the warm, treated, recirculated return fluid 20 coming from the condenser 19. After initial start-up the only fresh water or other fluid 22 to be added to the system replaces any losses experienced through condensate, air and/or steam bleed off 18 or leakage. Overall fresh water or fluid 22 demand with this invention is significantly reduced from that required for any existing direct brine use geothermal technology. Drawing 24 shows that a GEC 6, 7, 8, 9, 10 can work alone, without its system of supporting devices to augment or add heat to the fluid supplying a new or existing boiler 34 within the method of an electric power generating 32 plant.

Again, note that a GEE 6, 7, 8, 9, 35, an example of which can be seen in vertical cross section in Drawings 25 and 26 can be substituted for the GEC 6, 7, 8, 9, 10 shown in Drawing 24.

The second, somewhat simpler device served by a single geothermal heat source referred to as the "Geothermal Energy Exchanger" (GEE) 6, 7, 8, 9, 35 has also been invented. Whereas the GEC 6, 7, 8, 9, 10 utilizes multiple geothermal heat sources, the GEE 6, 7, 8, 9, 35 is fed by a single geothermal heat source. The Geothermal Energy Exchanger (GEE) is similar to the GEC 6, 7, 8, 9, 35 described above except that it consists of a single heat exchange cylinder 8 or geothermal heat source. The GEE 6, 7, 8, 9, 35 can have, but is not required to have an expanded, volumetric top section 35 to facilitate the supply of incoming fluid 5 and the discharge of outgoing heated fluid, vapor or steam 12.

It should be noted that the less capital intensive GEE 6, 7, 8, 9, 35 an example of which is shown in Drawings 25 and 26 can be substituted for a GEC 6, 7, 8, 9, 10 whenever multiple heat sources are not required. The GEE 6, 7, 8, 9, 35 may be particularly well suited to applications requiring less volume, such as to augment or add heat to new or existing fossil or nuclear fuel boiler 34 fluid. By adding geothermal heat energy to and thereby pre-heating the boiler 34 fluid, the amount of fossil or nuclear fuel required to be used is proportionately reduced. This type of augmentation as depicted in Drawings 23, 24 and 27 is intended to provide a "green", cost effective means for assisting fossil or nuclear fuel powered electric generating plants in obtaining compliance with increasingly stringent emissions standards.

The third system device, the depressurized mixing container (DMC) 4, a section through which is shown on Drawing 16, is an effectively insulated storage tank or container serving several functions. One function is to convectively mix return condensate 20 with fresh make-up fluid 22 thereby helping stabilize the overall fluid temperature. The fluid temperature can also be increased via auxiliary heating elements 31 installed at the bottom of the container 4. These elements 31 are to be powered by whichever method is being used. In an emergency situation they can be powered by an auxiliary generator (not shown) or by some other means. Also, as shown on Drawings 1, 15, 23 and 24, in an emergency the DMC 4 can be totally bypassed 25 via the fresh fluid by-pass line 25, which runs from the treated fluid storage tank 3 directly to the GEC 6, 7, 8, 9, 10 or to a GEE 6, 7, 8, 9, 35. The DMC 4 will normally have a free fluid surface at atmospheric pressure and will be equipped with a fluid level sensor and an overflow drain 29. In certain situations the DMC 4 can be designed and operated as a pressurized container 4 with pressure sensors and pressure relief valves 27. Either case is acceptable within the preferred embodiment. The overflow drain 29 would be omitted in the case of a pressurized container 4.

The DMC's 4 supply 5 the GEC's 6, 7, 8, 9, 10 or the GEE's 6, 7, 8, 9, 35 with fluid. The top portion of a GEC 6, 7, 8, 9, 10 is an insulated exchange chamber 10 with multiple heat exchange cylinders 8 connected to the chamber 10 bottom and extending down into the earth. These features of the GEC 6, 7, 8, 9, 10 can be seen in Drawings 1, 2, 3, 15, 18, 23 and 24.

The DMC's 4 can also supply 5 a GEE or GEE's 6, 7, 8, 9, 35 with fluid. The top portion 35 of the GEE 6, 7, 8, 9, 35 does not have to be enlarged, but supply 5 inflow and thermally efficient discharge outflow 12 will be enhanced by constructing the GEE 6, 7, 8, 9, 35 with some form of expanded volumetric top section 35. Cooler, denser supply 5 fluid should be introduced on one side near the bottom of the top section 35, whether or not it is enlarged 35; and the heated fluid, vapor or steam discharge 12 should be located on the opposite side near the top of the top section 35, whether or not it is enlarged 35. This will facilitate convectional flow within the GEE 6, 7, 8, 9, 35 by exploiting the relative density difference between the incoming 5 cooler, more dense fluid and the outgoing 12, heated, less dense fluid or steam.

The heat exchangers 8 themselves are in either case (GEC 6, 7, 8, 9, 10 or GEE 6, 7, 8, 9, 35) long cylindrical containers 8 (can be some other shape) installed below ground within or without a protective casing 6 to a depth sufficient to heat the convectively flowing internal fluid to a temperature, which after loses is sufficient to power a steam turbine 16 or turbines or provide heated fluid, vapor or steam for some other direct or indirect use 25. Vertical sections through the heat exchange cylinders 8 are shown in Drawings 1, 2, 3, 9, 15, 23, 24, 25 and 26. Horizontal cross sections through the exchange cylinders 8 and heating cores 7 located within the bottom portion of the heat exchange cylinders 8 are shown in Drawings 5, 6, 7 and 8. Horizontal sections through various exchange chamber 10 layouts can be viewed in Section A-A of Drawing 1 as well as in Drawings 4, 10, 11, 12, 13 and 14. Actual depth of the heat exchange cylinders 8 is determined for each site application by end use temperature requirements and the geological and geothermal structure to be heat mined. The diameter and number of heat exchange cylinders 8 (number applying only to the case of the GEC 6, 7, 8, 9, 10) to be used is determined in the same manner, but as modified by the drilling technology available now or in the future.

The heat exchange cylinders 8 are constructed of stainless steel or some other suitable material of such a thickness and construction so as to withstand very high below ground temperatures and very high pressures; especially within the lower portions of the cylinders 8. The heat exchange cylinders 8 can be of constant wall thickness or can be of varying wall thickness with the wall becoming thicker with depth so as to withstand the increasing pressure and temperature. Wall thickness can vary inside or out with a corresponding constant diameter outside or in. Drawing 2 shows cylinders having a variable inside diameter with a constant outside diameter. Drawing 3 shows a constant inside diameter with a variable outside diameter. The annular space between each heat exchange cylinder 8 and the protective casing 6 as well as between the protective casing 6 and the surrounding soil or rock is to be sealed or grouted 9 near the top to prevent unwanted gases such as hydrogen sulfide or contaminated geothermal brines from being unintentionally released to the surrounding environment or atmosphere. The location of these seals 9 can clearly be seen in Drawings 1, 2, 3, 5, 15, 18, 25 and 26.

There are no pumps, valves, nor other moving parts housed within the GEC 6, 7, 8, 9, 10, or the GEE 6, 7, 8, 9, 35 that is, the heat exchange cylinders 8 and exchange chamber 10 or in the case of the GEE 6, 7, 8, 9, 35 its expanded top 35. This can clearly be seen in Drawings 1 through 14 and also in Drawings 25 and 26. Fluid and/or steam flow within the GEC 6, 7, 8, 9, 10 and the GEE 6, 7, 8, 9, 35 is gravity driven convective flow, but can be pressurized via the elevation head provided by the free water surface of the mixing tank 4 or by pumping. Flow within the GEC 6, 7, 8, 9, 10 and the GEE 6, 7, 8, 9, 35 is convectively driven by density variation and buoyant forces resulting from conductively absorbed heat within the heat exchange cylinders 8.

Within the preferred embodiment the direction of fluid flow is always to be determined within the overall system and methods by pressure and/or density variation, whether naturally occurring or pumped. This can be for example, heated steam exhausted from the turbine 16 rising within the collector pipe 17 to the condenser 19 or it could be heated fluid or steam being discharged 12 and conveyed 13 to the (PSC) hot water/steam storage container 14 from the exchange chamber 10 or the top 35 of the GEE 6, 7, 8, 9, 35.

The DMC 4, GEC 6, 7, 8, 9, 10 or GEE 6, 7, 8, 9, 35 and PSC 14 as a system are capable of delivering an end product of hot fluid, vapor or steam. A relatively low pressure system, that is, a system where pressures are maintained below the vapor pressure of the heated fluid would convey steam. A higher pressure system, that is, where pressures are maintained above the fluid vapor pressure at any given temperature would convey liquid. Whichever phase is determined to be appropriate for the particular installation would then determine whether a phase separator 15, flash tank or other equipment be employed within the methods for supplying the turbine 16, turbines or some other direct or indirect use 25.

In the event local topographic features are capable of supporting an arrangement of devices providing the necessary elevation head to properly pressurize the system; some pumping can be eliminated or reduced. Elevation head can also be artificially provided by constructing elevated fluid storage tanks or stand pipes (not shown). In any case the arrangement of devices and equipment within the system and methods for optimizing the efficiency of any site is simply part of the preferred embodiment and does not constitute an alternative embodiment or a change in spirit or scope as set forth herein. This would also be true in the case where a casing 6 is not used, but some other means of lining and sealing the heat exchange well is employed.

The preferred embodiment may have at the very bottom of each heat exchange cylinder 8, that is, at the point of highest temperature, a significant mass of material, the heating core 7; typically copper, but can be some other material having very high thermal conduction characteristics and preferably a lower specific heat capacity than that of the internal fluid to be heated. This heating core mass 7, if employed, after initial start up heating can expedite the conductive heat exchange from surrounding hot rock or geothermal fluid to the internal fluid contained within a group of heat exchange cylinders 8 or in the case of the GEE 6, 7, 8, 9, 35 within its single cylinder, thereby enhancing the upward flow of heated steam or if the pressure of vaporization is exceeded and maintained, then heated fluid.

An example of a heating core 7 consisting of three portions or sections can be seen in Drawing 9. The uppermost heating core 7 section shown in Drawings 6 and 9 is actually a ring or doughnut of highly conductive material, such as copper, lining the interior of each cylinder 8. This ring 7 can be extended as high up the cylinder wall as temperature warrants; that is, to the point at which significant conductive fluid heating no longer occurs. Beyond that point or above that point conduction should be minimized as it will reverse the process and cause heat loss; whereby cylinder 8 insulation 11 (not shown) should appropriately be considered. The example middle section of the heating core 7 as can be seen in Drawings 7 and 9 is a perforated section. The purpose of the perforations 7 as well as the upper ring section is to increase the interior surface area available for conductive heat transfer. The bottom-most portion of the heating core 7 as shown in Drawings 8 and 9 is a solid mass. The ring section and perforated sections together are intended to increase the available surface area for heat transfer, which in turn affects the volume of liquid which can be heated per unit of time per cylinder 8.

In some situations the heating core 7 can be minimized or even eliminated, but if its 7 overall mass and available surface area are properly balanced in terms of specific heat capacity and thermal conductivity relative to the internal fluid being heated it 7 will enhance the overall heat transfer process and improve system efficiency. Whether the benefits of the heating core 7 merit the additional cost will be a function of system design at each individual site along with the method of perforation selected. The method of core 7 perforation used, such as vertical openings, tubular matrix, honeycomb or other is significant to effective design and heat transfer, but is not proprietary to the preferred embodiment. The embodiment does not specify as to type of perforation, but only to effective heat transfer between the geothermal environment outside each cylinder 8 and core 7 to the fluid internal to the cylinder 8 and its heating core 7, perforated or not.

The solid heating core 7 mass at the very bottom of each cylinder 8 provides additional structural integrity for that cylinder 8 as well as providing a relatively large mass of dense, conductively heated material. The large mass of heating core 7 material is intended to assist in retarding cooling of the mass, while conductively transferring the geothermal heat to as large a volume of interior fluid as rapidly as is possible. The preferred embodiment can employ a mass of heating core 7 material capable of conductively taking on heat at a rate higher than that at which it 7 is able to conductively give off or transfer heat to the internal fluid. This is accomplished by first selecting core material 7 having suitable specific heat capacity relative to the specific heat capacity of the internal fluid to be heated; and then manipulating the mass of heating core material 7 and the available "heat giving" interior surface area of the material 7 relative to the exterior "heat gaining" surface area of the core 7 mass. Such core material 7 so selected and designed can then enhance the conductive transfer of the earth's heat to the interior fluid. Note that these requirements can be met by employing copper as the heating core 7 material and treated water or chemically altered water as the internal fluid to be heated.

It should be noted that the GEC 6, 7, 8, 9, 10 installation will consist of multiple cylinders 8 installed within close proximity to one another. The combined mass of all the individual heating cores 7 together with the rock between them can constitute a very large mass of dense conductive material capable of heating a large volume of fluid per unit of time without significant cooling of the core 7 mass.

If the core 7 were completely solid the only surface area available for conductive heat transfer to the interior fluid would be the very top surface area of the core 7. This surface would be very hot and would be difficult to cool, but would be limited in its ability to heat large volumes of liquid per unit of time. In order for steam driven turbines 16 to generate electricity enormous amounts of steam must be provided. In order to aid in producing such volume in a cost effective manner the increased interior surface area of the perforated core 7 relative to its 7 exterior surface area exposed to the interior surface of the cylinder 8 plays a significant role.

While it is true that conductive heat transfer between each cylinder's 8 outside geothermal environment and the fluid internal to the cylinder 8 will occur along the cylinder's 8 length at any depth sufficient to expose it to higher outside temperatures without a heating core 7; it should also be noted that maximum volume of heated fluid per unit of time is paramount to system efficiency; therefore the applicability of the highly conductive heating core 7.

The more rapidly the heat transfer to the internal fluid occurs within each cylinder 8 the more volume that can be heated per unit of time per cylinder 8 and of course the higher the resulting efficiency as fewer cylinders 8 would be required to produce that requisite volume of heated fluid, vapor or steam. The copper heating cores 7 if used, can be of any highly conductive material other than copper, but must, in any case be compatible with the wall material of the heat exchange cylinders 8 in terms of coefficients of expansion and contraction. If the heating core mass 7 were to expand in an uncontrolled manner significantly more than the cylinder wall 8 material the heat exchange cylinders 8 could be damaged. A crack in a cylinder 8 wall could allow undesirable gases or contaminating geothermal brines to penetrate the cylinder 8, thereby compromising the environmental integrity of the closed system and possibly resulting in an unsafe condition. Conversely, if interior pressures were sufficiently high, seepage into the cylinder 8 would not occur, but leakage and waste of the interior heated fluid out of the cylinder 8 would occur. The proper evaluation and selection of the heating core mass 7 material is therefore critical to the overall structural integrity of the heat exchange cylinders 8 and the system. As mentioned above variation in the method of perforation or with the material used for the core 7, an example of which can be seen in Drawing 9 does not constitute an alternate embodiment nor does the minimization or deletion of the heating core 7 in its entirety.

At the risk of being redundant it should again be noted that the usual application of the GEC 6, 7, 8, 9, 10 will warrant the use of multiple or even many heat exchange cylinders 8 installed relatively close together; all serving one or more exchange chambers 10. This is shown repeatedly in Drawings 4, 10, 11, 12, 13 and 14. A group of cylinders 8 sandwiched together with solid rock between creates a unified structure capable of withstanding formidable earth forces. This is significant, particularly in any tectonically active area. Additionally the group of heating cores 7 located at the bottom of each individual sealed cylinder 8, taken together comprise a significant conductive mass capable of transferring considerable heat energy to the internal fluid. The heating cores 7 conductively accept heat from the surrounding geothermal environment via the totality of their cylindrical sides and bottom surface area. In turn the point of contact with the internal fluid to be heated is limited to the available exposed interior surface area of the heating cores 7. In principle then, when balanced properly, the cores 7 are able to take on heat at a higher rate than they can transfer it to the internal fluid as the receiving area for heat transfer is greater than the relatively smaller transfer area available to the fluid. This means that once heated it will be difficult to ever cool the collective heating core 7 mass. Only very large volumes of fluid could have any chance of cooling this significant core 7 mass.

It should be noted here that the thermal flux or the amount of energy flowing through a unit of core 7 material per unit of time varies inversely with the thickness of the core 7 material and varies directly with the temperature difference. This means that during the start-up procedure or initially the thickness of the core 7 will actually slow or reduce the thermal flux. However, once the core 7 material has been heated to the temperature of its surrounding geothermal environment, the flux across the core 7 thickness is zero as the entire core 7 mass is the same temperature. Conductive heat flow is now directly from the hot core 7 mass to the internal fluid. This is why it is important to appropriately balance the in and out thermal flow surface areas of the core 7 and also to be selective regarding the specific heat capacity of the material 7 being used. If the core 7 is allowed to cool by giving off heat to the internal fluid faster than it can gain heat from the surrounding geothermal environment, the flux across the core 7 thickness will no longer be zero and the rate of thermal flux will thereby be reduced. If this situation is allowed to develop the heated fluid volume, which can be provided per unit of time per cylinder 8 will be reduced and system efficiency will be correspondingly lower.

As cooler, more dense fluid enters into the bottom of the larger diameter GEC 6, 7, 8, 9, 10 exchange chamber 10 (the chamber 10 bottom can be seen in Drawing 18) located at the top of a group of smaller diameter heat exchange cylinders 8 and settles downward into the heat exchange cylinders 8 themselves; the fluid absorbs heat with increasing depth until it is heated sufficiently so as to lower its relative density to a point where it can begin rising back up through the cylinders 8 by convection. Convective flow may be laminar with well defined streamlines, may be turbulent or may be with convection cells forming to convey the warmer more energy laden fluid upward to the larger diameter exchange chamber 10. The type of convective flow regime which occurs within each cylinder 8 or within the exchange chamber 10 is not important to the functioning of the GEC 6, 7, 8, 9, 10 or the system. The convective flow within the heat exchange cylinders 8 and the exchange chamber 10 will essentially form internal flow paths without walls. Therefore, no internal piping is required within the heat exchange cylinders 8 as it would simply be redundant. This same concept applies to the GEE 6, 7, 8, 9, 35.

Convective flow resulting from gravitational and buoyant forces will occur within the GEC 6, 7, 8, 9, 10 or GEE 6, 7, 8, 9, 35 devices regardless of whether relatively high or low pressures are maintained within the system. At any given point within a cylinder 8 at any given temperature and pressure; a cooler, higher density fluid will settle or flow downward per the force of gravity and a correspondingly warmer, less dense fluid will rise due to buoyant forces. Again, to risk redundancy, this eliminates the need for any internal piping within the heat exchange cylinders 8. This is a unique and innovative feature of this invention and is clearly shown in Drawings 1, 2, 3, 9, 15, 23, 24, 25 and 26.

The upper, effectively insulated exchange chamber 10, of the GEC 6, 7, 8, 9, 10 a section through which is shown in Drawing 18 serves multiple functions. One function is to separate the heated fluid or steam discharge outlet 12 as far as practicable from the cold (actually warm) supply fluid inlet 5. Mixing of cold fluid with the heated fluid or steam near the hot fluid discharge outlet 12 will diminish the effectiveness of the system and if excessive could result in temperature variations in the delivery stream 13, which could in turn damage a turbine 16 or other equipment. This is why the heated fluid discharges 12 are located on one side near the top of the exchange chamber 10 and the cooler fluid supply inlets 5 are located on the opposing side near the bottom of the chamber 10.

The cooler supply fluid 5 entering near the bottom of the exchange chamber 10 is not intended to convectively mix with the heated fluid rising into the chamber 10. Obviously, its higher density prohibits this. The cooler supply fluid 5 enters the bottom of the exchange chamber 10 where its higher density naturally separates it from the rising heated fluid or steam to be discharged 12 and it is then available to the tops of the heat exchange cylinders 8 where its greater relative density will cause it to flow or settle downward into the cylinders 8. It is within the cylinders 8 that the cooler, denser fluid will settle downward until sustained conductive heating reduces its relative density sufficiently for buoyant forces to cause it to begin convectively rising up to the exchange chamber 10.

A second function of the GEC's 6, 7, 8, 9, 10 insulated, upper exchange chamber 10 is to provide a flexible manner of varying the storage volume of the system per the end user's needs. The heat exchange cylinders 8 are limited to their maximum diameter by the drilling technology available today or as per future improvements to drilling technology and techniques. This diameter limitation means that the volume of fluid which can be conductively heated and convectively flowed per unit of time per cylinder 8 is therefore also limited. The larger diameter of the upper exchange chamber 10 increases the storage volume of heated fluid available to the system. The larger the exchange chamber 10 the more heat exchange cylinders 8 that can feed it. Refer to Drawings 10, 11, 12, 13 and 14 to see just seven of many possible arrangements of heat exchange cylinders 8 feeding the bottom of an exchange chamber 10.

The exchange chamber 10 then is critical to the GEC's 6, 7, 8, 9, 10 ability to provide commercially viable volumes of heated fluid, vapor or steam for use by turbines 16 to generate electricity or for some other use 25. Drawings 10 through 14 show possible layouts of 17 through 1,035 cylinders 8 feeding a single exchange chamber 10. Drawings 10 through 14 are not intended to be exhaustive, but are included to show the numerous possibilities for layout and heated fluid or steam production with this system of devices. A variation in number or arrangement of exchange chambers 10, heat exchange cylinders 8 or any other associated devices employed within the system and methods does not constitute a departure from the scope and intent of this preferred embodiment. The overall shape, dimensions, size, depth and volume of the upper exchange chamber 10 can be varied regardless of the number of heat exchange cylinders 8 installed. The preferred embodiment is intended to encompass the flexibility required in system design necessary to accommodate various site conditions, which can be expected to be encountered.

Whether any particular element of the system is used or not used, or is used in large or small numbers does not constitute an alternate embodiment, but reflects the overall flexibility inherent with the preferred embodiment of this invention.

A final function of the exchange chamber 10 is to balance the temperature and pressure of the fluid, vapor or steam convectively emanating from the tops of the various heat exchange cylinders 8 connected to the bottom of the chamber 10. The heated fluid, vapor or steam product convectively emanating from the tops of the various cylinders 8 into the exchange chamber 10 will not generally be homogeneous and should be thermally balanced before discharging to any other device or equipment of the system or methods. The geothermal structure to be heat mined can be expected to be variable; therefore the heated fluid, vapor or steam product emanating from each individual cylinder 8 can be expected to be variable as relates to temperature, density, volume, etc.

The GEC 6, 7, 8, 9, 10 storage volume is additionally significant because a relatively small volume of cooler fluid will heat relatively quickly when added and convectively mixed with a very large volume of already heated fluid. It should be noted that even if there were no demand and the system were not flowing, convection will still be going on within the heat exchange cylinders 8 and exchange chamber 10. The geothermal heat sources never turn off and the heating process will never stop once initiated. (This feature of the technology does by the way; require a maintenance flow by-pass 24 around any turbines 16 or any other operating equipment having its own individual "start-up" requirements. The subject of by-pass 24, 26 and start-up procedure will be explained more fully in a separate section of this detailed description.) The cooler temperature, more dense fluid added to the GEC 6, 7, 8, 9, 10 or GEE 6, 7, 8, 9, 35 will settle downward within the cylinders 8 or cylinder 8 and the warmer, less dense heated fluid or steam near the bottom will rise continuously within a convective pattern having no need for internal piping to separate the two.

By operationally maintaining a large volume of already heated fluid relative to the demand flow rate of the system more capacity can be realized over a shorter time period than if a small volume of heated fluid was stored and a larger volume of cooler fluid had to be heated. It will take a longer time to heat large volumes of cool liquid, which necessarily reduces the flow rate of the system. When certain minimum temperatures must be maintained at certain constant flow rates—as to a steam turbine 16, whose blades when started spinning can easily be damaged by even slight variations—the ability to meet demand at the proper temperature and pressure is critical. The GEC 6, 7, 8, 9, 10 or the GEE 6, 7, 8, 9, 35 and their system are intended to meet such demands.

As explained above the substantial storage volume of the exchange chamber 10 is important relative to the overall thermal balance and system capacity. However, it should also be noted that excessively over sizing the exchange chamber 10 can have a negative effect on system capacity. The larger diameter exchange chamber 10 has a correspondingly large surface area. Conductive heat losses are proportional to this surface area. Therefore, it is first of all, important to effectively insulate 11 the exchange chamber 10 against these losses. Secondly, even with effective insulation 11, as the size of the exchange chamber 10 is increased; eventually a point may be reached where cooling of such a large fluid mass exposed to such a large surface area becomes inevitable. Once this point is reached the system is confronted with having to heat a large mass of relatively cooler fluid. This situation would disrupt or slow the steady rate of heated steam delivery to the turbines 16 potentially resulting in damage and certainly resulting in loss of efficiency. Therefore the dimensions, size and storage volume of the exchange chamber 10, although necessarily substantial; should always be in balance with the fluid or steam demand and the rate of heat transfer within the exchange cylinders 8 below and between the exchange chamber 10 and its environment outside. The same thinking applies to over sizing the top portion 35 of the GEE 6, 7, 8, 9, 35.

This maximum limitation in exchange chamber 10 size may require that more than one geothermal energy collector 6, 7, 8, 9, 10 be manifolded together in order to provide sufficient heated fluid volume to a turbine 16 or turbines. As long as the system is balanced in terms of flow, temperature and pressure there is no practical limit to the number of geothermal energy collectors 6, 7, 8, 9, 10 that can be connected together so as to increase the volume of heated fluid, vapor or steam which can be supplied. It does, however, seem reasonable that a single large exchange chamber 10 served by a large number of heat exchange cylinders 8 may be more practical and more cost effective.

Drawings 19, 20, 21 and 22 show just a few possible system layouts for the GEC 6, 7, 8, 9, 10, which might feed a series of turbines 16. Sixteen layouts, A through P are shown.

Again these layouts are not intended to be exhaustive, but are included to show the flexible nature of this system in mining heat from a geothermal source and then transferring the earth's energy to an end user, say a group of steam driven turbines 16 for the production of electricity and distribution to a grid. It should be noted that manifolding two or more GEC's 6, 7, 8, 9, 10 or GEE's 6, 7, 8, 9, 35 together within a system requires a sophisticated control system to balance flows 13 with temperature and pressure from the different individual devices, all or any of which can be expected to be variable.

In similar fashion Drawing 27 shows five example system layouts, Q through V for the GEE 6, 7, 8, 9, 35 as might be employed within the Geothermal Heat Energy Method. As mentioned earlier this second method is intended as a cost competitive heat augmentation technology, which can be implemented at existing fossil or nuclear powered electricity generating plants. This supplementary method can be implemented in phases, whereby the savings realized by one phase can be utilized to capitalize the next phase. This is significant as compliance with more stringent environmental standards can be expensive and difficult to budget for.

The fourth device included within the system is the pressurized heated fluid or steam container (PSC) 14, a section through which is shown in Drawing 17. This storage container 14 can retain fluid under relatively high pressure conditions or steam if pressure below the fluid's vapor pressure is maintained. Whether heated fluid or steam is utilized within this container 14 and the system is a matter of system design. The preferred embodiment encompasses either liquid or steam phase without preference. As shown on Drawings 1 and 15 the PSC 14 can discharge 23 heated fluid to a phase separator 15 or flash tank or could be designed to discharge 15 steam directly to a bank of turbines 16 or some other appropriate distribution device. It can also augment an existing power plant boiler 34 by directly or indirectly pre-heating the supply fluid as shown on Drawing 23.

The PSC 14 provides a storage function as well as providing an important final control over fluid temperature and pressure just prior to use. The PSC 14 is fitted with temperature and pressure sensors as well as with pressure relief valves 27 in order to provide monitoring and control. Fluid or steam temperature and/or pressure can be increased via the use of auxiliary heating elements 31 installed at the bottom of the container 14. These control features coupled with the appropriate mass balance between supply 13 and discharge 23 capacity creates an operational device 14, which plays a useful, if not critical role in the system. In the case of augmenting or adding heat to boiler 34 fluid at an existing plant, the additional control provided by the PSC 14 may not be necessary. This condition is shown in Drawing 24.

Existing rock and soil data compiled by the United States Geological Survey (USGS) and others shows significant variability of heat flow rates in various soil and rock conditions over fairly short distances. Extrapolating this data suggests that any geothermal heat energy extraction system should be flexible enough to heat mine variable conditions and depths along with variable horizontal configurations. The GEC 6, 7, 8, 9, 10 or the GEE 6, 7, 8, 9, 35 and their system outlined herein and contained within this preferred embodiment is intended to accomplish precisely that.

This flexibility of the Geothermal Energy Collector (GEC) 6, 7, 8, 9, 10 or the Geothermal Energy Exchanger (GEE) 6, 7, 8, 9, 35 and their system allowing a single GEC unit 6, 7, 8, 9, 10 or GEE 6, 7, 8, 9, 35 to function or many units 6, 7, 8, 9, 35 to function together in virtually any horizontal arrangement is important. It is important because the geothermal structure being heat mined can be expected to vary in depth, shape, overall dimension and temperature from place to place. A circular loop may meet the need in one location. A rectangular loop may work better in a different location. A long curvilinear snakelike arrangement may be needed to exploit a long narrow geothermal anomaly in another location. Various demands of end users will require different temperature ranges and different volumes to be delivered. The GEC device 6, 7, 8, 9, 10 or the GEE device 6, 7, 8, 9, 35 and system provides sufficient flexibility to accommodate almost limitless variations in arrangement and demand.

START-UP/SHUT-DOWN PROCEDURE. It is at least necessary to mention that an appropriate start-up and shut-down procedure must be implemented along with these devices 6, 7, 8, 9, 35, system and methods for safety reasons and for protection of equipment, particularly turbines 16. A turbine 16 is a relatively delicate machine. For example, slight variations in temperature, pressure or volume of the delivery stream 23 can damage steam turbine 16 blades, which are spinning at a very high velocity. To avoid such a situation proper start-up and shut-down procedures must be implemented and followed. A brief generalized description follows:

At start-up, fresh unheated fluid 22 can be introduced to the DMC 4 until it reaches an acceptable percent of its capacity, say five or ten percent. At this point fluid can slowly begin to be introduced to the GEC 6, 7, 8, 9, 10 or GEC's or to the GEE 6, 7, 8, 9, 35 or GEE's as the case may be. Never at any point in the process should a large amount of cold fluid 22 be allowed to accumulate in the DMC 4, the GEC 6, 7, 8, 9, 10 or the GEE 6, 7, 8, 9, 35. As mentioned earlier to allow this would be to potentially cool the core 7 mass with a corresponding decrease in thermal flux. The slow initial release of fluid will insure that only small percentages of cooler fluid are ever being actively heated at any given time. Introducing too large a volume of cooler fluid over a short time span will compromise the operational capacity of the system.

Fluid can continue to be introduced to the DMC 4, GEC 6, 7, 8, 9, 10 or GEE 6, 7, 8, 9, 35 until such time as the temperature and pressure within the GEC or GEC's 6, 7, 8, 9, 10 or the GEE 6, 7, 8, 9, 35 or GEE's is sufficient so as to begin releasing heated fluid or steam 12, 13 to the PSC 14 or group of PSC's. During this period of time the filled volume of the DMC 4 can be increased to operational capacity by taking flows of warm return condensate 20 from the condenser 19, which up until now has been receiving fluid by-passing 24 the turbine(s) 16. Temperature and pressure should first be increased within the PSC 14 and the GEC 6, 7, 8, 9, 10 or GEE 6, 7, 8, 9, 35 until sufficient for release of fluid or steam to the condenser by-pass line 24, which can then feed the DMC 4 with warm return 20 fluid. Once the circulating system via the by-pass 24 line is up to operational capacity the only fluid required to be added to the system is make-up fluid 22 to replace evaporative, bleed-off 18, waste or leakage losses.

Initially the turbine 16 or turbines must be by-passed 24 with flow going directly to the condenser 19 until such time as the entire system and method is up and running at acceptable capacity, temperature and pressure. Once the condenser 19 and return 20 system is at capacity in re-feeding the DMC 4 and the GEC or GEC's 6, 7, 8, 9, 10 or the GEE 6, 7, 8, 9, 35 or GEE's and the full cycle is operational—only then is it appropriate to begin the turbine 16 or turbine's start-up procedure. At this point the PSC 14 can begin releasing flow to the phase separator 15, flash tank, turbine 16 or other equipment as may be appropriate. The system and method can then be brought up to full operational levels.

The shut down procedure involving any turbine 16 is the reverse of the above except that the geothermal heat extraction system can remain operational if desired by slowly switching the "off" turbine 16 feed over to the condenser 19 by-pass line 24 and simply letting it continue to circulate. If only a single turbine 16 is employed then emergency power would be required to continue operating the system or the entire system would have to be shut down. This would require going through the start-up procedure again.

If several turbines 16 are employed and appropriate by-pass lines 24, 26 and redundancies are in place, it should be possible to perform routine maintenance on any portion of the system and methods without having to shut down the entirety. This is left to system design and is not pertinent to this preferred embodiment.

It shall be understood that the devices 6, 7, 8, 9, 10, 35, system and methods herein described are always a part of, and are providing heat energy to, some other process or equipment, such as a steam turbine used in the generation of electricity or for some other direct or indirect use, such as, food processing, the heating of buildings or even to pre-heat boiler 34 fluid at an existing power plant. Therefore the above described configuration and arrangement of devices along with the described system and methods as relates to any equipment they may serve is necessarily and merely illustrative of the application of the principles employed with this invention. Within and in keeping with the spirit and scope of the preferred embodiment are numerous arrangements, uses and modifications, too numerous to show here, which do not constitute a departure from the spirit and scope of the claims made below.

Detailed Listing of Numbered Elements of the Devices, System and Methods

1 WATER OR OTHER LIQUID SUPPLY
2 WATER OR OTHER LIQUID TREATMENT AND/OR ADDITIVE SYSTEM
3 TREATED WATER OR OTHER LIQUID STORAGE
4 DEPRESSURIZED MIXING CONTAINER (DMC)
5 SUPPLY PIPING TO GEC OR GEE
6 PROTECTIVE CASING (OPEN BOTTOM)
7 BOTTOM HEATING CORE
8 HEAT EXCHANGE CYLINDER(S) (CLOSED, SEALED BOTTOM)
9 SEAL AT TOP OF CYLINDER AND/OR CASING
10 EXCHANGE CHAMBER
11 INSULATION
12 STEAM OR HOT FLUID DISCHARGE
13 STEAM OR HOT FLUID DELIVERY PIPING TO PSC OR BOILER
14 STEAM OR HOT FLUID STORAGE CONTAINER (PSC)
15 PHASE SEPARATOR OR FLASH CHAMBER (if needed)
16 STEAM TURBINE
17 EXHAUST STEAM COLLECTOR TO CONDENSER
18 EXHAUST STEAM CONDENSATE DRAIN
19 CONDENSER(S)
20 CONDENSATE RETURN PIPING TO DMC
21 MAKE-UP WATER SUPPLY PIPING TO CONDENSER (S)
22 TREATED MAKE-UP WATER SUPPLY PIPING TO DMC
23 STEAM LINE TO TURBINE OR HOT FLUID LINE TO PHASE SEPARATOR OR FLASH CHAMBER
24. BY-PASS PIPING TO CONDENSER
25 DISTRIBUTION TO OTHER USE
26 BY-PASS PIPING TO GEC OR GEE
27 PRESSURE SENSOR AND RELIEF VALVE
28 BACKFLOW VALVE
29 OVERFLOW DRAIN
30 MAINTENANCE DRAIN
31 AUXILIARY HEATING ELEMENT
32 ELECTRIC POWER GENERATOR
33 ELECTRIC POWER DISTRIBUTION GRID
34 POWER PLANT BOILER
35 EXPANDED VOLUMETRIC GEE TOP Detailed Listing of Drawings 1 Single GEC System Within the Method
2 GEC w/ Below Ground Exchange Chamber (Shows Example of Seven Cylinders.)
3 GEC w/ Above Ground Exchange Chamber (Shows Example of Seven Cylinders.)
4 Exchange Chamber Cross Section A-A (Shows Example of Seven Cylinders.)
5 Heat Exchange Cylinder Cross Section B-B
6 Heating Core Top Cross Section C-C 1
7 Heating Core Middle Cross Section C-C 2
8 Heating Core Bottom Cross Section C-C 3
9 Heating Core Vertical Cross Section D-D
10 Exchange Chamber Layouts 1:17 & 1:33
11 Exchange Chamber Layouts 1:135 & 1:238
12 Exchange Chamber Layout 1:524
13 Exchange Chamber Layout 1:708
14 Exchange Chamber Layout 1:1,035
15 GEE System Within the Method
16 Depressurized Mixing Container (DMC) Cross Section
17 Pressurized Storage Container (PSC) Cross Section
18 Exchange Chamber Cross Section
19 Example System Layouts A through F
20 Example System Layouts G through L
21 Example System Layouts M and N
22 Example System Layouts O and P
23 GEC w/ System Augmenting Boiler(s)
24 GEC w/o System Augmenting Boiler(s)
25 GEE w/ Sloped Volumetric Top
26 GEE w/ Segmented Expanding Top
27 Example System Layouts Q through V

We claim:

1. A Device named the Geothermal Energy Collector (GEC),
which connects to multiple geothermal heat sources via its insulated or non-insulated exchange chamber,
said exchange chamber to be constructed of materials suitable for the intended use, able to withstand high temperatures and pressures,
and its insulated or non-insulated heat exchange cylinders to be constructed of materials suitable for the intended use,
able to withstand high temperatures and pressures,
with said exchange chamber being installed above ground, partially below ground or completely below ground,
receiving pumped or non-pumped fluid;
said exchange chamber consists of only one inlet pipe near the bottom for receiving incoming fluid
said incoming fluid introduced to the open tops of the heat exchange cylinders near the bottom of the exchange chamber,
said fluid flowing downward into the cylinders,
until conductively heated and convectively rising within the heat exchange cylinders,
with such heated fluid, vapor or steam received back into the exchange chamber where it is thermally mixed and discharged;
said exchange chamber mounted at the top of said multiple heat exchange cylinders,
each of which is conductively heating and convectively discharging said fluid, vapor or steam,
with each of the multiple cylinders installed into the earth to a depth sufficient to conductively transfer the earth's heat to the internal fluid;
with each cylinder able to contain at its sealed bottom a heating core, perforated, partially perforated or non-perforated, made of highly conductive material,
the whole of which conductively transfers heat energy from within the earth to said internal fluid,
and then convectively rising to the earth's surface;
where such energy laden fluid, vapor or steam is collected in the exchange chamber for thermal mixing and discharge, used to directly or indirectly add heat energy to any process, or to drive steam turbines for the generation of electricity.

2. A System of Geothermal Energy Collectors as claimed in claim 1 comprised of devices, containers and appurtenances, referred to as the Geothermal Fluid Heating or Steam Production System, which includes, one or more Depressurized Mixing Containers (DMC)

and one or more Pressurized Storage Containers (PSC), such system receiving and dischargingfluid, vapor or steam and within which, Geothermal Energy Collectors are provided with un-heated, pre-heated, thermally mixed and/or recirculated fluid, which is heated within said Geothermal Energy Collectors and which system receives, stores and adjusts said fluid, heated fluid, vapor or steam and delivers said heated fluid, vapor or steam to directly or indirectly add heat to any process, or supplying heated fluid, vapor or steam to turbines to generate electricity.

3. A Geothermal Electricity Production Method comprised of Geothermal Energy Collectors as claimed in claim 1 using Geothermal Energy Collectors to generate electricity by driving steam turbines, then condenses used waste steam and returns said condensate along with added make-up fluid, for heating and/or re-heating, within the Geothermal Energy Collectors, then reusing and reheating the already reheated fluid along with any make-up fluid in a continuous cycle.

4. A Geothermal Heat Energy Method comprising Geothermal Energy Collectors as claimed in claim 1, using condensate to produce heated fluid, vapor or steam and using said fluid, vapor or steam, to add heat energy, retrofit or augment a power plant boiler.

\* \* \* \* \*